(12) United States Patent
Wu et al.

(10) Patent No.: US 12,323,969 B2
(45) Date of Patent: Jun. 3, 2025

(54) METHOD AND APPARATUS FOR TRANSMITTING CONFIGURED GRANTED CHANNELS

(71) Applicant: Samsung Electronics Co., Ltd., Suwon-si (KR)

(72) Inventors: Min Wu, Beijing (CN); Feifei Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 365 days.

(21) Appl. No.: 17/743,136

(22) Filed: May 12, 2022

(65) Prior Publication Data

US 2022/0386330 A1 Dec. 1, 2022

(30) Foreign Application Priority Data

May 31, 2021 (CN) .......................... 202110604346.2
Aug. 4, 2021 (CN) .......................... 202110892029.5

(51) Int. Cl.
*H04W 72/1263* (2023.01)
*H04W 72/0446* (2023.01)
*H04W 72/0453* (2023.01)
*H04W 72/566* (2023.01)
*H04W 76/28* (2018.01)

(52) U.S. Cl.
CPC ... *H04W 72/1263* (2013.01); *H04W 72/0446* (2013.01); *H04W 72/0453* (2013.01); *H04W 72/569* (2023.01); *H04W 76/28* (2018.02)

(58) Field of Classification Search
CPC ............ H04W 72/1263; H04W 76/28; H04W 72/569; H04W 72/0446; H04W 72/0453

USPC ......................................................... 370/329
See application file for complete search history.

(56) References Cited

U.S. PATENT DOCUMENTS

| | | |
|---|---|---|
| 2019/0132862 A1 | 5/2019 | Jeon et al. |
| 2019/0372639 A1 | 12/2019 | Lo et al. |
| 2020/0045768 A1 | 2/2020 | He et al. |
| 2020/0404604 A1 | 12/2020 | Hande et al. |

(Continued)

FOREIGN PATENT DOCUMENTS

WO    2018/183100 A1    10/2018

OTHER PUBLICATIONS

Vivo, R1-2001693, Discussion on 2nd DRX group. 3GPP TSG-RAN WG1 Meeting #100bis e-Meeting, Apr. 20-30, 2020.

(Continued)

*Primary Examiner* — Nicholas R Taylor
*Assistant Examiner* — Chong G Kim
(74) *Attorney, Agent, or Firm* — Jefferson IP Law, LLP

(57) ABSTRACT

The disclosure relates to a $5^{th}$ generation (5G) or $6^{th}$ generation (6G) communication system for supporting a higher data transmission rate. A method performed by a user equipment and the user equipment are provided. The method performed by the user equipment includes receiving information related to scheduling without a grant or information related to Radio Resource Control (RRC) Connected state-Discontinuous Reception (C-DRX), and performing an operation related to scheduling without a grant or an operation related to C-DRX correspondingly, based on the received information.

9 Claims, 12 Drawing Sheets

(56) References Cited

U.S. PATENT DOCUMENTS

| 2021/0136811 | A1 | 5/2021 | Cao et al. | |
|---|---|---|---|---|
| 2021/0258989 | A1* | 8/2021 | Zhang | H04W 72/535 |
| 2023/0422273 | A1* | 12/2023 | Ye | H04L 1/1887 |
| 2024/0314771 | A1* | 9/2024 | Guo | H04W 72/1268 |

OTHER PUBLICATIONS

International Search Report with Written Opinion dated Aug. 18, 2022, issued in International Patent Application No. PCT/KR2022/006715.
Intel Corporation; Discussion on Enhancements to URLLC/IIoT in Unlicensed Band; 3GPP TSG RAN WG1 Meeting #104-e; RI-2100651; e-Meeting; Jan. 25-Feb. 5, 2021.
LG Electronics; Discussion on unlicensed band URLLC/IIOT; 3GPP TSG RAN WG1 #104-e; RI-2100882; e-Meeting; Jan. 25-Feb. 5, 2021.
Partial Supplementary European Search Report with Provisional Opinion Accompanying the Partial Search Report dated Oct. 1, 2024; European Appln. No. 22816338.2-1215 / 4331320 PCT/KR2022006715.

* cited by examiner

METHOD AND APPARATUS FOR TRANSMITTING CONFIGURED GRANTED CHANNELS

CROSS-REFERENCE TO RELATED APPLICATION(S)

This application is based on and claims priority under 35 U.S.C. § 119(a) of a Chinese patent application number 202110604346.2, filed on May 31, 2021, in the State Intellectual Property Office, and of a Chinese patent application number 202110892029.5, filed on Aug. 4, 2021, in the State Intellectual Property Office, the disclosure of each of which is incorporated by reference herein in its entirety.

BACKGROUND

1. Field

The disclosure relates to the technical field of wireless communication. More particularly, the disclosure relates to a method performed by a user equipment (UE) and the user equipment.

2. Description of Related Art $5^{th}$ generation (5G) mobile communication technologies define broad frequency bands such that high transmission rates and new services are possible, and can be implemented not only in "Sub 6 GHz" bands such as 3.5 GHz, but also in "Above 6 GHz" bands referred to as millimeter wave (mmWave) including 28 GHz and 39 GHz. In addition, it has been considered to implement $6^{th}$ generation (6G) mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BW), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random-access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method performed by a user equipment including receiving information related to scheduling without grant or information related to Radio Resource Control (RRC) Connected state-Discontinuous Reception (C-DRX), and performing an operation related to scheduling without grant or an operation related to C-DRX correspondingly, based on the received information.

Additional aspects will be set forth in part in the description which follows and, in part, will be apparent from the description, or may be learned by practice of the presented embodiments.

In accordance with an aspect of the disclosure, a user equipment is provided. The user equipment includes a transceiver configured to transmit and receive signals with the outside, and a processor configured to control the transceiver to perform a method performed by the user equipment.

In accordance with another aspect of the disclosure, a non-transitory computer-readable recording medium having programs stored thereon, which are used to, when executed by a computer, perform any of the above methods is provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include" or "may include" refers to the existence of a corresponding disclosed function, operation or component which can be used in various embodiments of the disclosure and does not limit one or more additional functions, operations, or components. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term "or" used in various embodiments of the disclosure includes any or all of combinations of listed words. For example, the expression "A or B" may include A, may include B, or may include both A and B.

Unless defined differently, all terms used herein, which include technical terminologies or scientific terminologies, have the same meaning as that understood by a person skilled in the art to which the disclosure belongs. Such terms as those defined in a generally used dictionary are to be interpreted to have the meanings equal to the contextual meanings in the relevant field of art, and are not to be interpreted to have ideal or excessively formal meanings unless clearly defined in the disclosure.

Figure 1:
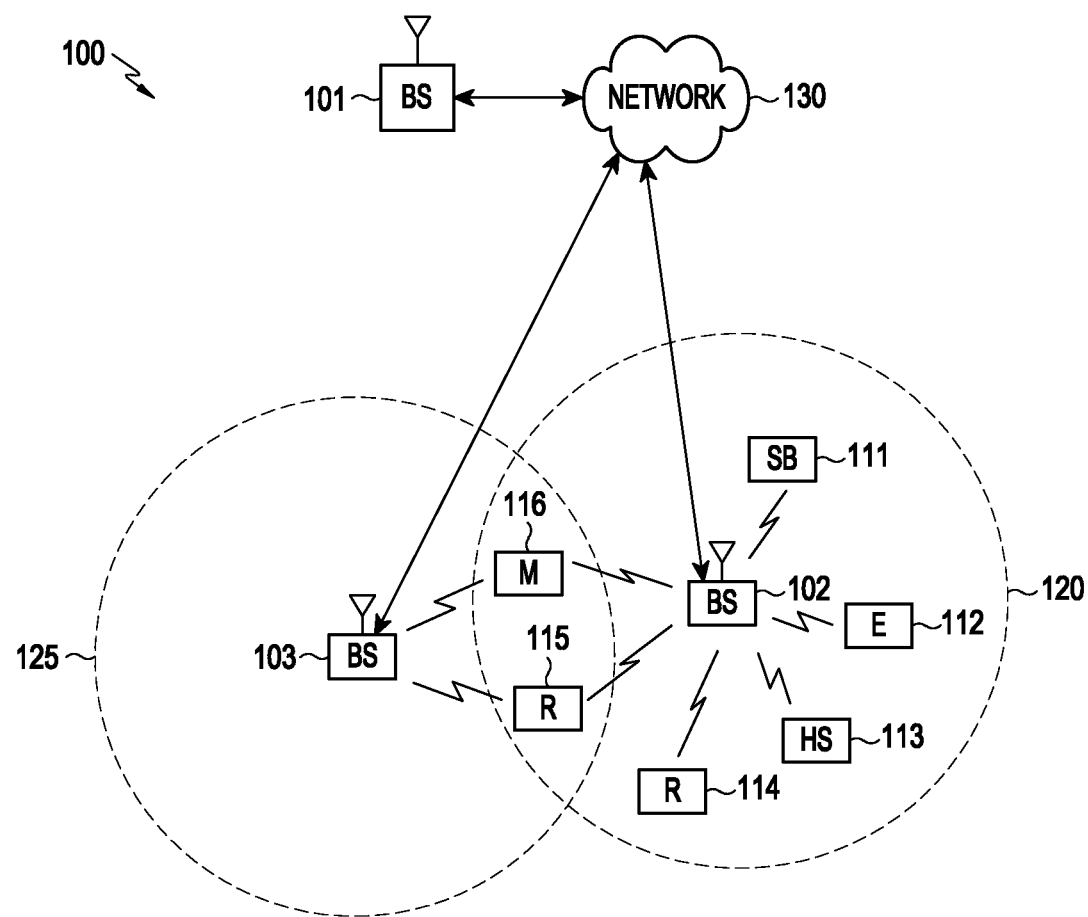
FIG. 1 illustrates an example wireless network according to an embodiment of the disclosure.

FIG. 1 illustrates an example wireless network according to an embodiment of the disclosure. The embodiment of the wireless network 100 shown in FIG. 1 is for illustration only. Other embodiments of the wireless network 100 can be used without departing from the scope of the disclosure.

Referring to FIG. 1, the wireless network 100 includes a gNodeB (gNB) 101, a gNB 102, and a gNB 103. gNB 101 communicates with gNB 102 and gNB 103. gNB 101 also communicates with at least one Internet Protocol (IP) network 130, such as the Internet, a private IP network, or other data networks.

Depending on a type of the network, other well-known terms such as "base station" or "access point" can be used instead of "gNodeB" or "gNB". For convenience, the terms "gNodeB" and "gNB" are used in this patent document to refer to network infrastructure components that provide wireless access for remote terminals. And, depending on the type of the network, other well-known terms such as "mobile station", "user station", "remote terminal", "wireless terminal" or "user apparatus" can be used instead of "user equipment" or "UE". For convenience, the terms "user equipment" and "UE" are used in this patent document to refer to remote wireless devices that wirelessly access the gNB, no matter whether the UE is a mobile device (such as a mobile phone or a smart phone) or a fixed device (such as a desktop computer or a vending machine).

gNB 102 provides wireless broadband access to the network 130 for a first plurality of User Equipments (UEs) within a coverage area 120 of gNB 102. The first plurality of UEs include a UE 111, which may be located in a Small Business (SB); a UE 112, which may be located in an enterprise (E); a UE 113, which may be located in a WiFi Hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. gNB 103 provides wireless broadband access to network 130 for a second plurality of UEs within a coverage area 125 of gNB 103. The second plurality of UEs include a UE 115 and a UE 116. In some embodiments, one or more of gNBs 101-103 can communicate with each other and with the UEs 111-116 using 5G, Long Term Evolution (LTE), LTE Advanced (LTE-A), Worldwide Interoperability for Microwave Access (WiMAX) or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a two-dimensional (2D) antenna array as described in embodiments of the disclosure. In some embodiments, one or more of gNB 101, gNB 102, and gNB 103 support codebook designs and structures for systems with 2D antenna arrays.

Although FIG. 1 illustrates an example of the wireless network 100, various changes may be made to FIG. 1. The wireless network 100 may include any number of gNBs and any number of UEs in any suitable arrangement, for example. Furthermore, gNB 101 may directly communicate with any number of UEs and provide wireless broadband access to the network 130 for those UEs. Similarly, each gNB 102-103 may directly communicate with the network 130 and provide direct wireless broadband access to the network 130 for the UEs. In addition, gNB 101, 102 and/or 103 may provide access to other or additional external networks, such as external telephone networks or other types of data networks.

Figure 2A:
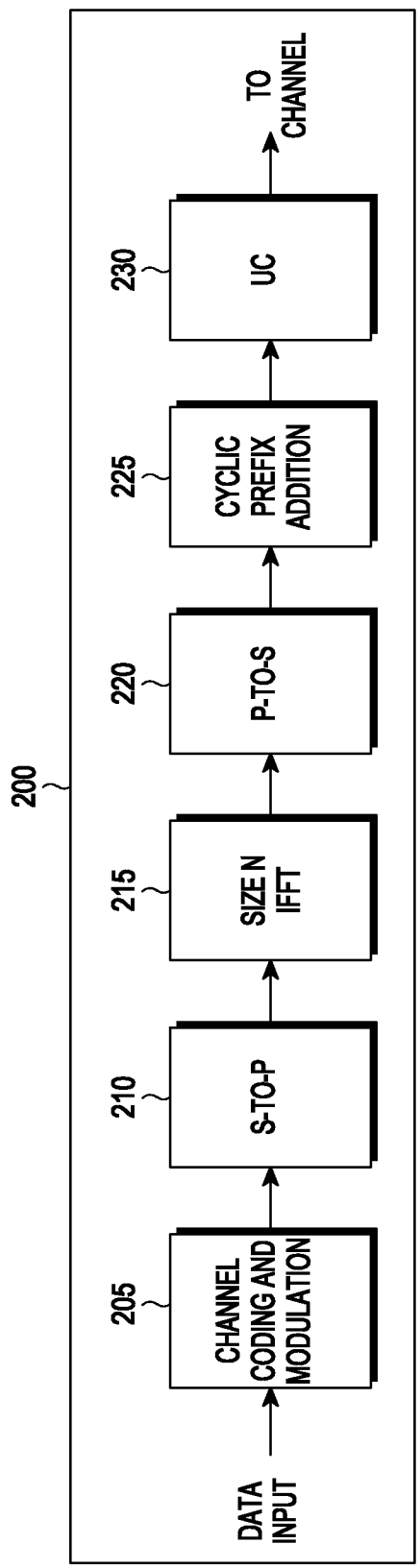
FIGS. 2A and 2B illustrate example wireless transmission and reception paths according to various embodiments of the disclosure.
Figure 2B:
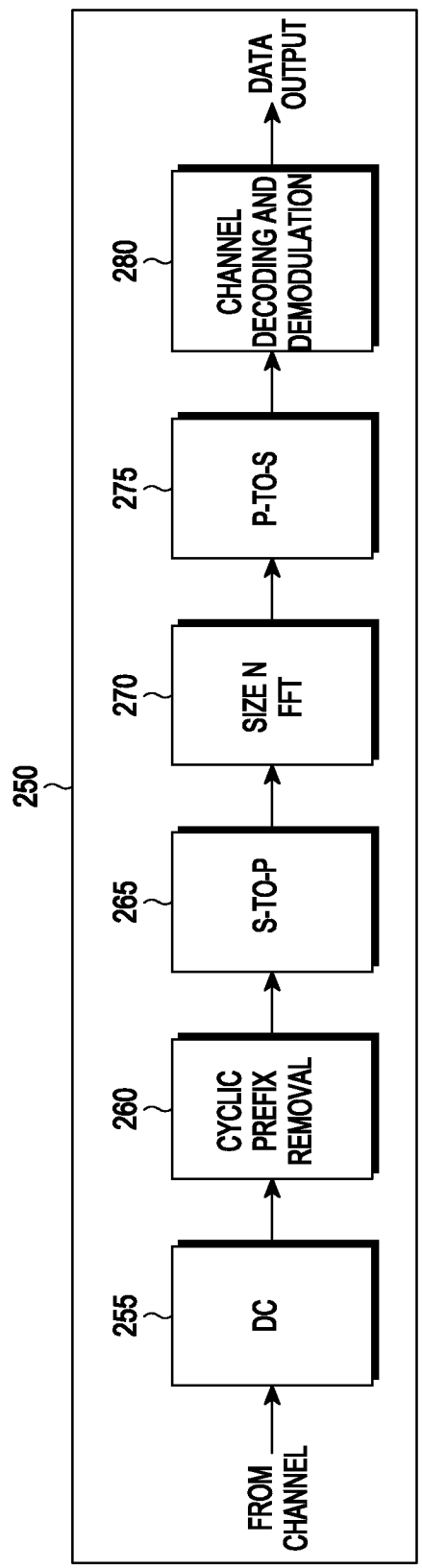

FIGS. 2A and 2B illustrate example wireless transmission and reception paths according to various embodiments of the disclosure.

Referring to FIGS. 2A and 2B, the transmission path 200 may be described as being implemented in a gNB, such as gNB 102, and the reception path 250 may be described as being implemented in a UE, such as the UE 116. However, it should be understood that the reception path 250 may be implemented in a gNB and the transmission path 200 may be implemented in a UE. In some embodiments, the reception path 250 is configured to support codebook designs and structures for systems with 2D antenna arrays as described in embodiments of the disclosure.

The transmission path 200 includes a channel coding and modulation block 205, a Serial-to-Parallel (S-to-P) block 210, a size N Inverse Fast Fourier Transform (IFFT) block 215, a Parallel-to-Serial (P-to-S) block 220, a cyclic prefix addition block 225, and an up-converter (UC) 230. The reception path 250 includes a down-converter (DC) 255, a cyclic prefix removal block 260, a Serial-to-Parallel (S-to-P) block 265, a size N Fast Fourier Transform (FFT) block 270, a Parallel-to-Serial (P-to-S) block 275, and a channel decoding and demodulation block 280.

In the transmission path 200, the channel coding and modulation block 205 receives a set of information bits, applies coding (such as Low Density Parity Check (LDPC) coding), and modulates the input bits (such as using Quadrature Phase Shift Keying (QPSK) or Quadrature Amplitude Modulation (QAM)) to generate a sequence of frequency-domain modulated symbols. The Serial-to-Parallel (S-to-P) block 210 converts (such as demultiplexes) serial modulated symbols into parallel data to generate N parallel symbol streams, where N is a size of the IFFT/FFT used in gNB 102 and the UE 116. The size N IFFT block 215 performs IFFT operations on the N parallel symbol streams to generate a time-domain output signal. The Parallel-to-Serial block 220 converts (such as multiplexes) parallel time-domain output symbols from the Size N IFFT block 215 to generate a serial time-domain signal. The cyclic prefix addition block 225 inserts a cyclic prefix into the time-domain signal. The UC 230 modulates (such as up-converts) the output of the cyclic prefix addition block 225 to an RF frequency for transmission via a wireless channel. The signal may also be filtered at a baseband before switching to the RF frequency.

The RF signal transmitted from the gNB 102 arrives at the UE 116 after passing through the wireless channel, and operations in reverse to those at gNB 102 are performed at the UE 116. The down-converter 255 down-converts the received signal to a baseband frequency, and the cyclic prefix removal block 260 removes the cyclic prefix to generate a serial time-domain baseband signal. The Serial-to-Parallel block 265 converts the time-domain baseband signal into a parallel time-domain signal. The Size N FFT block 270 performs an FFT algorithm to generate N parallel frequency-domain signals. The P-to-S 275 converts the parallel frequency-domain signal into a sequence of modulated data symbols. The channel decoding and demodulation block 280 demodulates and decodes the modulated symbols to recover the original input data stream.

Each of the gNBs 101-103 may implement a transmission path 200 similar to that for transmitting to the UEs 111-116 in the downlink, and may implement a reception path 250 similar to that for receiving from the UEs 111-116 in the uplink. Similarly, each of the UEs 111-116 may implement the transmission path 200 for transmitting to the gNBs 101-103 in the uplink, and may implement a reception path 250 for receiving from the gNBs 101-103 in the downlink.

Each of the components in FIGS. 2A and 2B may be implemented using only hardware, or using a combination of hardware and software/firmware. As a specific example, at least some of the components in FIGS. 2A and 2B may be implemented in software, while other components may be implemented in configurable hardware or a combination of software and configurable hardware. For example, the FFT block 270 and the IFFT block 215 may be implemented as configurable software algorithms, in which the value of the size N may be modified according to the implementation.

Furthermore, although described as using FFT and IFFT, this is only illustrative and should not be interpreted as limiting the scope of the disclosure. Other types of transforms may be used, such as Discrete Fourier transform (DFT) and Inverse Discrete Fourier Transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B may be combined, further subdivided or omitted, and additional components can be added according to specific requirements. Furthermore, FIGS. 2A and 2B are intended to illustrate examples of types of transmission and reception paths that may be used in a wireless network. Any other suitable architecture may be used to support wireless communication in a wireless network.

Figure 3A:
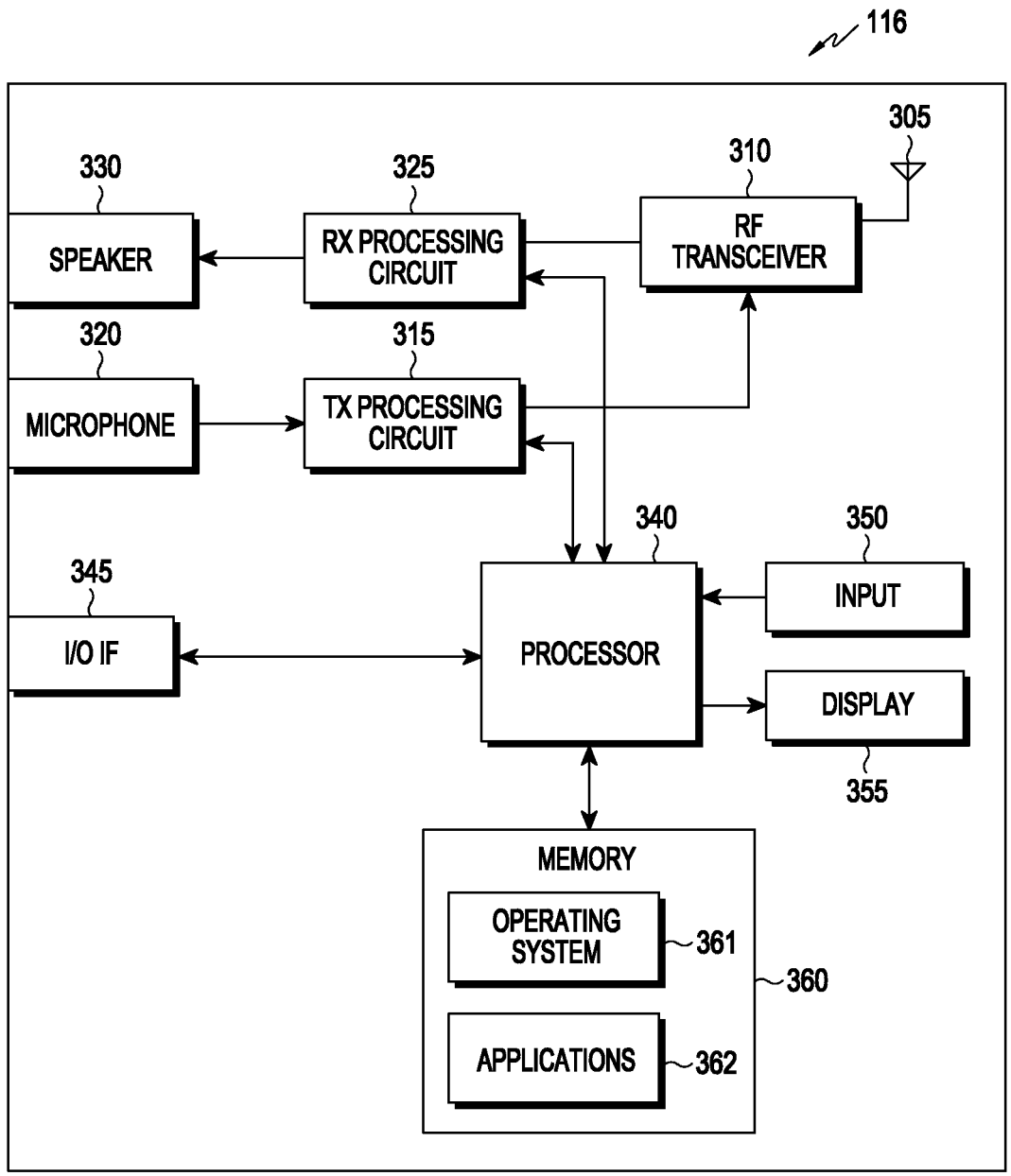
FIG. 3A illustrates an example user equipment (UE) according to an embodiment of the disclosure.

FIG. 3A illustrates an example UE according to an embodiment of the disclosure. The embodiment of the UE 116 shown in FIG. 3A is for illustration only, and the UEs 111-115 of FIG. 1 can have the same or similar configuration. However, a UE has various configurations, and FIG. 3A does not limit the scope of the disclosure to any specific implementation of the UE.

Referring to FIG. 3A, the UE 116 includes an antenna 305, a radio frequency (RF) transceiver 310, a transmission (TX) processing circuit 315, a microphone 320, and a reception (RX) processing circuit 325. The UE 116 also includes a speaker 330, a processor/controller 340, an input/output (I/O) interface 345, an input device(s) 350, a display 355, and a memory 360. The memory 360 may include an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to the speaker 330 (such as for voice data) or to the processor/controller 340 for further processing (such as for web browsing data).

The TX processing circuit 315 receives analog or digital voice data from the microphone 320 or other outgoing baseband data (such as network data, email or interactive video game data) from the processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 may include one or more processors or other processing devices and execute an OS 361 stored in the memory 360 in order to control the overall operation of the UE 116. For example, the processor/controller 340 may control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the disclosure. The processor/controller 340 may move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides the UE 116 with the ability to connect to other devices such as laptop computers and handheld computers. The I/O interface 345 is a communication path between these accessories and the processor/controller 340.

The processor/controller 340 is also coupled to the input device(s) 350 and the display 355. An operator of the UE 116 may input data into the UE 116 using the input device(s) 350. The display 355 may be a liquid crystal display or other display capable of presenting text and/or at least limited graphics (such as from a website). The memory 360 is coupled to the processor/controller 340. A part of the memory 360 may include a random access memory (RAM), while another part of the memory 360 may include a flash memory or other read-only memory (ROM).

Although FIG. 3A illustrates an example of the UE 116, various changes may be made to FIG. 3A. For example, various components in FIG. 3A may be combined, further subdivided or omitted, and additional components may be added according to specific requirements. As a specific example, the processor/controller 340 may be divided into a plurality of processors, such as one or more central processing units (CPUs) and one or more graphics processing units (GPUs). Furthermore, although FIG. 3A illustrates that the UE 116 is configured as a mobile phone or a smart phone, the UEs may be configured to operate as other types of mobile or fixed devices.

Figure 3B:
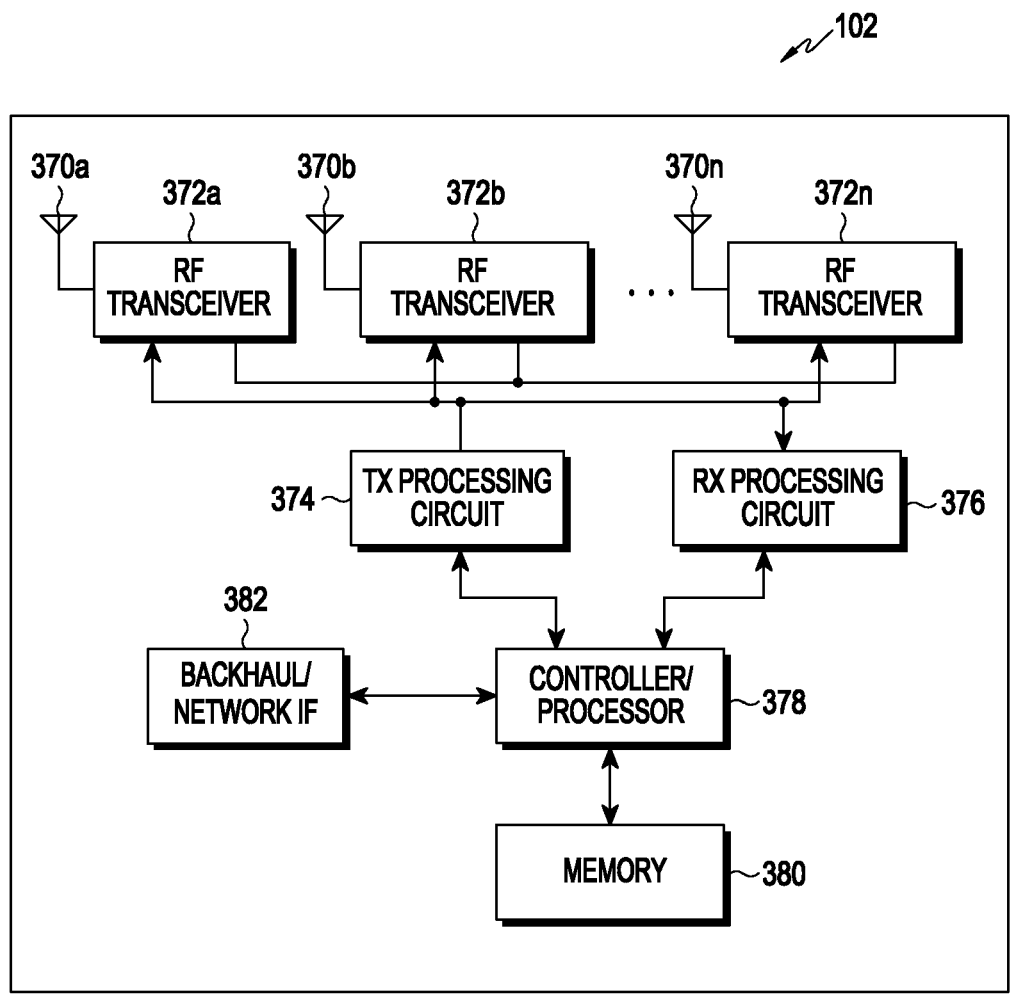
FIG. 3B illustrates an example base station gNB 102 according to an embodiment of the disclosure.

FIG. 3B illustrates an example gNB according to an embodiment of the disclosure. The embodiment of gNB 102 shown in FIG. 3B is for illustration only, and other gNBs of FIG. 1 can have the same or similar configuration. However, a gNB has various configurations, and FIG. 3B does not limit the scope of the disclosure to any specific implementation of a gNB. It should be noted that gNB 101 and gNB 103 can include the same or similar structures as gNB 102.

Referring to FIG. 3B, the gNB 102 includes a plurality of antennas 370a-370n, a plurality of RF transceivers 372a-372n, a transmission (TX) processing circuit 374, and a reception (RX) processing circuit 376. In certain embodiments, one or more of the plurality of antennas 370a-370n include a 2D antenna array. The gNB 102 also includes a controller/processor 378, a memory 380, and a backhaul or network interface 382.

The RF transceivers 372a-372n receive an incoming RF signal from the antennas 370a-370n, such as a signal transmitted by the UEs or other gNBs. The RF transceivers 372a-372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to the controller/processor 378 for further processing.

The TX processing circuit 374 receives analog or digital data (such as voice data, network data, email or interactive video game data) from the controller/processor 378. The TX processing circuit 374 encodes, multiplexes and/or digitizes outgoing baseband data to generate a processed baseband or IF signal. The RF transceivers 372a-372n receive the outgoing processed baseband or IF signal from The TX processing circuit 374 and up-convert the baseband or IF signal into an RF signal transmitted via the antennas 370a-370n.

The controller/processor 378 may include one or more processors or other processing devices that control the overall operation of the gNB 102. For example, the controller/processor 378 may control the reception of forward channel signals and the transmission of backward channel signals through the RF transceivers 372a-372n, the RX processing circuit 376 and the TX processing circuit 374 according to well-known principles. The controller/processor 378 may also support additional functions, such as higher-level wireless communication functions. For example, the controller/processor 378 may perform a Blind Interference Sensing (BIS) process such as that performed through a BIS algorithm, and decode a received signal from which an interference signal is subtracted. A controller/processor 378 may support any of a variety of other functions in the gNB 102. In some embodiments, the controller/processor 378 includes at least one microprocessor or microcontroller.

The controller/processor 378 is also capable of executing programs and other processes residing in the memory 380, such as a basic OS. The controller/processor 378 may also support channel quality measurement and reporting for systems with 2D antenna arrays as described in embodiments of the disclosure. In some embodiments, the controller/processor 378 supports communication between entities such as web RTCs. The controller/processor 378 may move data into or out of the memory 380 as required by an execution process.

The controller/processor 378 is also coupled to the backhaul or network interface 382. The backhaul or the network interface 382 allows the gNB 102 to communicate with other devices or systems through a backhaul connection or through a network. The backhaul or network interface 382 may support communication over any suitable wired or wireless connection(s). For example, when the gNB 102 is implemented as a part of a cellular communication system, such as a cellular communication system supporting 5G or new radio access technology or NR, LTE or LTE-A, the backhaul or network interface 382 may allow the gNB 102 to communicate with other gNBs through wired or wireless backhaul connections. When the gNB 102 is implemented as an access point, the backhaul or network interface 382 may allow the gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 may include a RAM, while another part of the memory 380 may include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of the gNB 102 (implemented using the RF transceivers 372a-372n, the TX processing circuit 374 and/or the RX processing circuit 376) support aggregated communication with FDD cells and TDD cells.

Although FIG. 3B illustrates an example of the gNB 102, various changes may be made to FIG. 3B. For example, the gNB 102 may include any number of each component shown in FIG. 3A. As a specific example, the access point may include many the backhaul or network interfaces 382, and the controller/processor 378 may support routing functions to route data between different network addresses. As another specific example, although shown as including a single instance of the TX processing circuit 374 and a single instance of the RX processing circuit 376, the gNB 102 may include multiple instances of each (such as one for each RF transceiver).

The various embodiments of the disclosure are further described below in conjunction with the accompanying drawings.

The text and drawings are provided as examples only to help readers understand the disclosure. They are not intended and should not be interpreted as limiting the scope of the disclosure in any way. Although certain embodiments and examples have been provided, based on the content disclosed herein, it is obvious to those skilled in the art that modifications to the illustrated embodiments and examples can be made without departing from the scope of the disclosure.

In the existing Long Term Evolution (LTE) system and New Radio (NR) system, in order to save the overhead of scheduling signaling and reduce the delay of data scheduling, both uplinks and downlinks support scheduling without grant, that is, for each Physical Downlink Shared Channel (PDSCH) or Physical Uplink Shared Channel (PUSCH), a user equipment (UE) is not required to receive corresponding dynamic scheduling information, but receives the PDSCH or transmits the PUSCH based on pre-configured configuration information for scheduling without grant that may be used periodically, that is, the UE receives the PDSCH or transmits the PUSCH on pre-configured physical resources periodically.

In the LTE system, such scheduling without grant is also called Semi-Persistent Scheduling, such as Semi-Persistent Scheduling-Physical Downlink Shared Channel (SPS-PDSCH) and Semi-Persistent Scheduling-Physical Uplink Shared Channel (SPS-PUSCH), in which parameters such as a cycle of scheduling without grant transmission are configured by Radio Resource Control (RRC) layer signaling, while scheduling without grant information is configured or reconfigured by activating Downlink Control Information (DCI) and released by deactivating the DCI.

In the NR system, downlink scheduling without grant is similar to the LTE system, that is, the downlink scheduling without grant also supports the SPS-PDSCH. Uplink scheduling without grant is slightly different from the LTE system. The uplink scheduling without grant in the NR system is also called Configured Grant scheduling, that is, scheduling without grant information is pre-configured, and the uplink scheduling without grant supports two Types. For scheduling without grant of Type 1, pre-configured scheduling without grant information is configured by RRC layer signaling, that is, it is configured together with parameters such as a cycle of scheduling without grant; for scheduling without grant of Type 2, it is essentially the same as the SPS-PUSCH of the LTE system, and the pre-configured scheduling without grant information is configured or reconfigured by activating DCI, and may also be cleared by deactivating the DCI.

Compared with dynamic scheduling, the existing scheduling without grant technology may save the overhead of scheduling signaling and reduce the delay of data scheduling, and also save the power consumption of terminals. However, for Extended Reality (XR) terminals that do not have the condition for frequent charging, the existing scheduling without grant technology is required to further enhance the Power Saving technology. The XR terminals refer to terminals that support Extended Reality (XR) services, which include enhancement services of multiple realities such as Augmented Reality (AR), Virtual Reality (VR), Mixed Reality (MR), Cinematic Reality (CR), and the XR terminals are required to periodically process video streams with a large amount of data, which consumes a lot of power. In some specific application scenarios, the XR terminal does not have the condition for frequent charging, and the power saving technology is very important to it. The application provides a specific scheme for the power saving technology related to the scheduling without grant transmission.

In addition, a size of data packets of the XR services may change within a certain range, and the existing scheduling without grant transmission that only supports one transport block may no longer be applicable. This application also gives a specific scheme for the related enhancement for the scheduling without grant transmission technology.

The following continues to introduce implementations of a method performed by the user equipment provided by an embodiment of the disclosure in detail in conjunction with the drawings.

Figure 4:
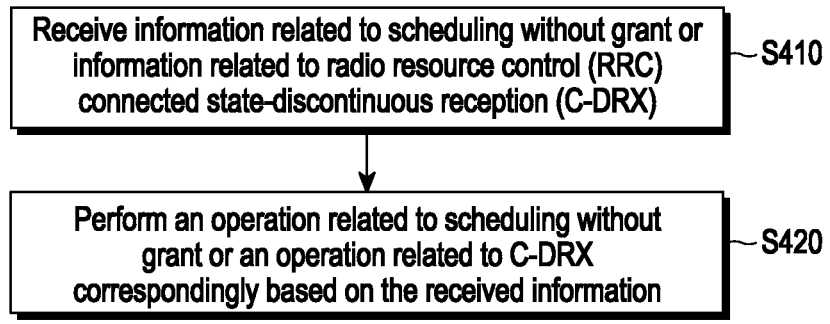
FIG. 4 illustrates a flowchart of a method performed by a user equipment according to an embodiment of the disclosure.

FIG. 4 illustrates a flowchart of a method performed by a user equipment according to an embodiment of the disclosure.

Referring to FIG. 4, a method may include operation S410 and operation S420.

At operation S410, information related to scheduling without grant or information related to Radio Resource Control (RRC) Connected state-Discontinuous Reception (C-DRX) may be received at the user equipment.

At operation S420, an operation related to scheduling without grant or an operation related to C-DRX may be performed by the user equipment correspondingly based on the received information.

By receiving the information related to scheduling without grant or the information related to Radio Resource Control (RRC) Connected state-Discontinuous Reception (C-DRX) and performing the operation related to scheduling without grant or the operation related to C-DRX correspondingly based on the received information by the user equipment, power saving of the user equipment is achieved, and it may adapt to scenarios where a size of data packets may change within a certain range, making scheduling more flexible, making full use of resources, and reducing periodic signaling overhead.

Various details of the above embodiments of the method performed by the user equipment are described in detail below.

Corresponding operations in a scenario of scheduling without grant is firstly introduced below, but it can be understood that the application is not limited to the scenario of scheduling without grant.

The support of scheduling without grant transmission with multiple Transport Blocks (TBs) in one transmission cycle is introduced below in conjunction with FIGS. 5 to 7.

In the existing scheduling without grant transmission, only transmission of one transport block (TB) is supported in one cycle, and this method may not be suitable for XR services. In the XR services, an amount of data that arrives periodically is very large, even it cannot be transmitted at one time, and is required to be split into multiple Transport Blocks (TBs) for transmission. A size of actually arriving data packets is not determined, but fluctuates within a certain range, thus, the existing scheduling without grant transmission that only supports one TB is not suitable for the XR services.

In order to solve the above problems, the embodiment of the disclosure provides a method performed by a user equipment, in which scheduling without grant transmission supports transmission of multiple TBs in one transmission cycle, that is, a base station reserves physical resources of the multiple TBs in one transmission cycle, and the UE receives or transmits the multiple TBs on resources pre-configured in one transmission cycle.

Specifically, the method performed by the user equipment includes the following steps:

Step 1: the UE receives configuration information for the scheduling without a grant transmission, which is used to configure that multiple transport blocks may be transmitted in one cycle.

Step 2: the UE receives an active DCI for the scheduling without the grant transmission, which is used to indicate time-frequency domain resources corresponding to the multiple transport blocks.

Step 3: the UE receives multiple PDSCHs of scheduling without a grant or transmits multiple PUSCHs of scheduling without grant on the time-frequency domain resources corresponding to the multiple transport blocks.

It can be understood that the above embodiment is only an example embodiment, and the disclosure includes various variants of the above embodiment, for example, some steps may be added or omitted or replaced, for example, Step 2 in the above method performed by the user equipment may be omitted. Alternatively, a number of transport blocks is configured in the configuration information for the scheduling without grant transmission, or the corresponding time-frequency domain resources are configured for each transport block of the multiple transport blocks respectively, or a gap of each transport block of the multiple transport blocks relative to a previous transport block is configured, or information such as a gap of each transport block of the multiple transport blocks relative to the first transport block is configured. It can be understood that the disclosure is not limited to this and will not be repeated here.

The transmission of the multiple TBs may be supported in one transmission cycle by the scheduling without the grant transmission, so that large data packets that arrive periodically may be completely transmitted by using the pre-configured time-frequency domain resources in a splitting way, and a transmitting end (for example, it may be the user equipment or base station) may use reserved resources of a part of the TBs according to a size of the actually arriving data packets, and release reserved resources of other TBs to make full use of the resources, thus making the scheduling more flexible and making full use of the resources.

The above specific process may be used for downlink scheduling without grant (also known as Semi-persistent Scheduling (SPS)) transmission and uplink scheduling without grant (also known as Configured Grant (CG)) transmission of Type 2. For the uplink scheduling without grant transmission of Type 1, Step 2 of the above process may be omitted, and the scheduling resources of the multiple TBs may be configured by RRC layer signaling, that is, indication information of the scheduling resources of the multiple TBs may be included in an RRC configuration message for the scheduling without grant transmission in Step 1.

The time-frequency domain resources corresponding to the multiple transport blocks (TBs) supported in one transmission cycle is introduced below in conjunction with FIGS. 5 to 7.

Figure 5:
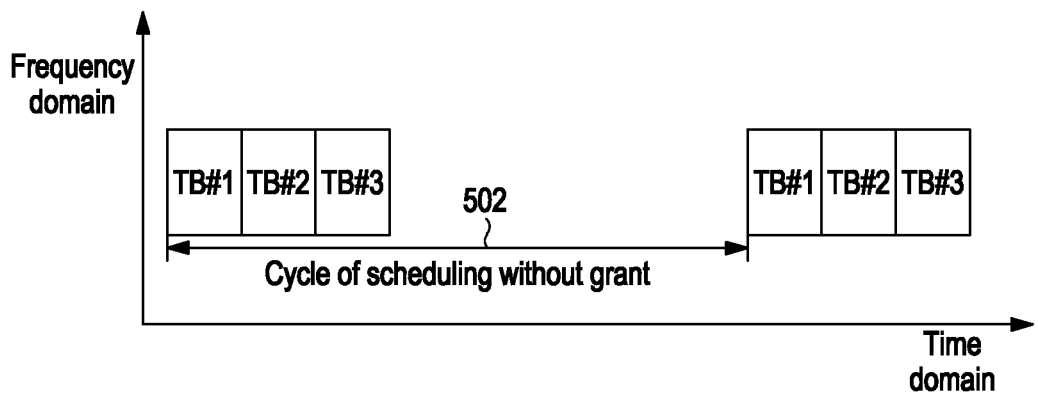
FIG. 5 illustrates a schematic diagram of time-frequency domain resources corresponding to multiple transport blocks (TBs) supported in one transmission cycle according to an embodiment of the disclosure.

FIG. 5 illustrates a schematic diagram of time-frequency domain resources corresponding to multiple transport blocks (TBs) supported in one transmission cycle according to an embodiment of the disclosure.

Figure 6:
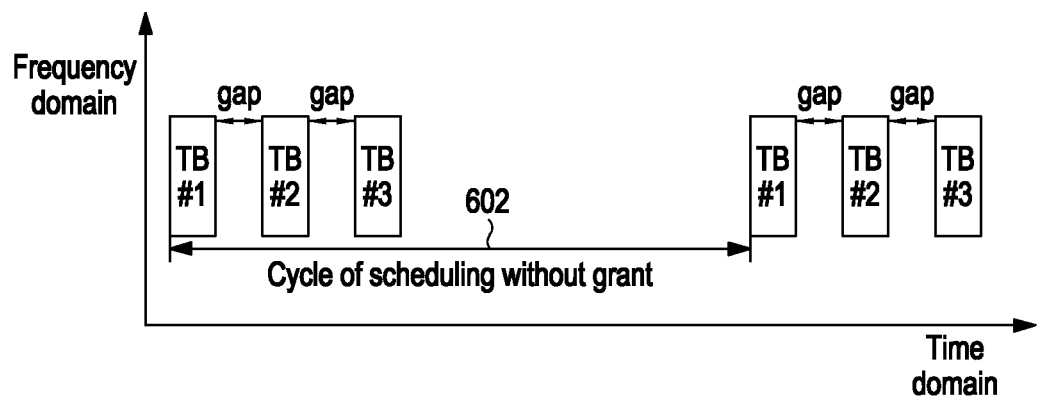
FIG. 6 illustrates another schematic diagram of time-frequency domain resources corresponding to multiple transport blocks (TBs) supported in one transmission cycle according to an embodiment of the disclosure.

FIG. 6 illustrates another schematic diagram of time-frequency domain resources corresponding to multiple transport blocks (TBs) supported in one transmission cycle according to an embodiment of the disclosure.

Figure 7:
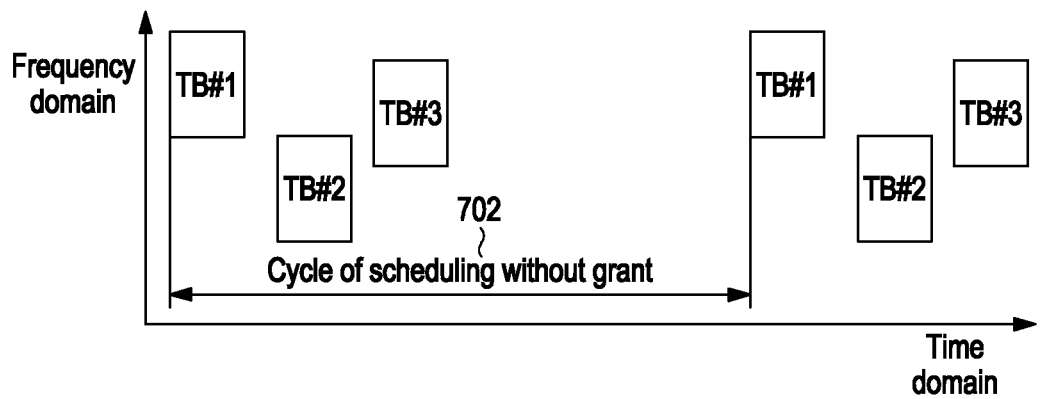
FIG. 7 illustrates yet another schematic diagram of time-frequency domain resources corresponding to multiple transport blocks (TBs) supported in one transmission cycle according to an embodiment of the disclosure.

FIG. 7 illustrates yet another schematic diagram of time-frequency domain resources corresponding to multiple transport blocks (TBs) supported in one transmission cycle according to an embodiment of the disclosure.

Referring to FIGS. 5-7, in an alternative scheme, if multiple TBs supported by scheduling without grant transmission in one cycle use the same frequency domain resources in consecutive slots, the existing configuration mode of scheduling without grant information may be reused, and only a number of the multiple TBs is required to be additionally configured. For example, for the scheduling without grant transmission indicating time-frequency domain resources by active DCI, a transmission slot determined according to DCI is a transmission slot of the first TB, and transmission slots of the remaining TBs are continuous slots after the transmission slot. As shown in FIG. 5, the scheduling without grant transmission supports transmission of three TBs (e.g., TB #1, TB #2, and TB #3) in one cycle (e.g., a cycle of scheduling without grant 502), wherein the three TBs use the same frequency domain resources, and transmission slots of the three TBs are continuous.

In another alternative scheme, the multiple TBs supported by the scheduling without grant transmission in one cycle may use the same frequency domain resources in discontinuous slots, and gaps of slots in which any two adjacent TBs are located may be the same or different, which may be pre-configured, that is, in addition to additional configuring of the number of the TBs, it is also necessary to configure a gap of slots in which adjacent TBs are located, or a gap of each TB relative to a previous TB, or a gap of each TB relative to the first TB. Referring to FIG. 6, the scheduling without grant transmission supports transmission of three TBs (e.g., TB #1, TB #2, and TB #3) in one cycle (e.g., a cycle of scheduling without grant 602), wherein the three TBs use the same frequency domain resources, transmission slots of the three TBs are discontinuous, and the gaps of slots in which any two adjacent TBs are located are the same.

In another alternative scheme, the multiple TBs supported by the scheduling without grant transmission in one cycle may use different frequency domain resources in discontinuous slots, that is, time-frequency domain resources of each TB are required to be configured separately. Referring to FIG. 7, the scheduling without grant transmission supports transmission of three TBs (e.g., TB #1, TB #2, and TB #3) in one cycle (e.g., a cycle of scheduling without grant 702), wherein the three TBs may use different frequency domain resources, and transmission slots of the three TBs may be discontinuous.

In an alternative scheme, the scheduling without grant transmission supports the transmission of the multiple TBs in one cycle, that is, it supports transmission of multiple PDSCHs or multiple PUSCHs, and the transmission of the multiple TBs shares the same Modulation and Coding Scheme (MCS), that is, an MCS indicated in the configuration message or the active DCI for the scheduling without grant transmission is used for transmission of all TBs. In addition, the transmission of the multiple TBs uses time-frequency resource blocks of the same size, so the transmission of the multiple TBs supported by the scheduling without grant transmission in one cycle has the same Transport Block Size (TBS). Due to different positions of reference signals in different slots, although the size of the time-frequency resource blocks used for the transmission of the multiple TBs is the same, a total number of REs used for data mapping may be different, while a TBS of the scheduling without grant transmission is decided by a number of REs transmitted by the first TB by default, or decided by a minimum (or maximum) number of REs in the transmission of the multiple TBs by default.

In an alternative scheme, the scheduling without grant transmission supports the transmission of the multiple TBs in one cycle, that is, it supports the transmission of multiple PDSCHs or multiple PUSCHs, and the number of the multiple TBs is indicated by the configuration message or the active DCI for the scheduling without grant transmission; or, a maximum number of TBs supported by the scheduling without grant transmission in one cycle is indicated by the configuration message for the scheduling without grant transmission, and a number of TBs actually supported is further indicated by the active DCI.

In an alternative scheme, the scheduling without grant transmission supports the transmission of the multiple TBs in one cycle, that is, it supports the transmission of multiple PDSCHs or multiple PUSCHs, and the multiple TBs are transmitted in consecutive slots, which may share the same DMRS for channel estimation. For example, a DMRS contained in the first TB transmission slot may be used for channel estimation of the second TB transmission slot. In order to support this operation, a pre-coding vector should be the same in all slots sharing the DMRS. In addition, since the channel estimation may be performed across multiple slots, time domain density of the DMRS may be further reduced, and the DMRS in these consecutive slots may be located in different symbols.

In an alternative scheme, the downlink scheduling without grant transmission supports the transmission of the multiple TBs in one cycle, that is, it supports the transmission of multiple PDSCHs, and the multiple PDSCHs share the same Transmission Configuration Indication (TCI) indication field, that is, the TCI indication field in the active DCI is used for the transmission of the multiple PDSCHs, and the transmission of the multiple PDSCHs uses a same beam.

In an alternative scheme, the scheduling without grant transmission supports the transmission of the multiple TBs in one cycle, that is, it supports the transmission of multiple PDSCHs or multiple PUSCHs, and the transmission of the multiple TBs uses a same Redundancy Version (RV), for example, an RV indication field contained in the active DCI is used for the transmission of the multiple TBs; or, the multiple TBs supported by the scheduling without grant transmission in one cycle use a predefined or pre-configured RV sequence, for example, the RV sequence is {0 2 3 1}, which indicates that an RV of the first TB transmission is 0, an RV of the second TB transmission is 2, an RV of the third TB transmission is 3, and an RV of the fourth TB transmission is 1. If a number of TBs of the scheduling without grant transmission in one cycle exceeds 4, then the RV sequence is recycled, that is, an RV of the fifth TB transmission is 0, an RV of the sixth TB transmission is 3, and so on.

In an alternative scheme, the downlink scheduling without grant transmission supports the transmission of the multiple TBs in one cycle, that is, it supports the transmission of multiple PDSCHs that share the same PUCCH resource for downlink Hybrid Automatic Repeat Request (HARQ) feedback, and HARQ-ACKs of the multiple PDSCHs are multiplexed on one PUCCH resource for transmission, a time domain position of which is decided by a time domain position of the last PDSCH; or, the multiple PDSCHs are grouped, and each PDSCH group contains N PDSCHs, where N may be predefined or pre-configured, and HARQ-ACKs of the N PDSCHs are multiplexed on one PUCCH resource for transmission, that is, every N PDSCHs correspond to one PUCCH resource, and a time domain position of the PUCCH resource is decided by a time domain position of the last PDSCH in the PDSCH group, and different PDSCH groups correspond to a same PUCCH resource in different time domain positions; or, the multiple PDSCHs each correspond to one PUCCH resource, and these PUCCH resources are the same PUCCH resources in different time domain positions, that is, they have a same frequency domain position and code domain index, and only the time domain positions are different (in different slots), and the time domain positions of these PUCCH resources are decided by the respective PDSCH time domain positions.

In an alternative scheme, HARQ process numbers corresponding to the multiple TBs supported by the scheduling without grant transmission in one cycle are continuous. If a system only configures one scheduling without grant transmission, a HARQ process number corresponding to the first TB of scheduling without grant is #0, and HARQ process numbers of other TBs increment based on #0, that is, a HARQ process number corresponding to the second TB is #1, a HARQ process number corresponding to the third TB is #2, and so on. If the system may configure multiple scheduling without grant transmissions that may be activated at the same time, a total number of TBs supported by the multiple scheduling without grant transmissions that may be activated should be less than or equal to the existing maximum number of HARQ processes, that is, it cannot exceed 16. The HARQ process numbers corresponding to the multiple TBs supported by the scheduling without grant transmissions are decided by an order in the total number of TBs. For example, if the base station configures three scheduling without grant transmissions that may be activated, which support transmission of two TBs, three TBs and four TBs respectively, HARQ process numbers corresponding to two TBs supported by the first scheduling without grant transmission are #0 and #1, HARQ process numbers corresponding to three TBs supported by the second scheduling without grant transmission are #2, #3 and #4, HARQ process numbers corresponding to three TBs supported by the third scheduling without grant transmission are #5, #6 and #7, and so on.

In an alternative scheme, the downlink scheduling without grant transmission (i.e. Semi-persistent Scheduling PDSCH, SPS-PDSCH) has multiple PDSCHs in one cycle, which correspond to the transmission of the multiple TBs. If a parameter harq-ProcID-Offset for deciding a start HARQ process number is not contained in an SPS-PDSCH configuration message, then a HARQ process number of the PDSCH_index-th PDSCH in one SPS-PDSCH cycle is determined according to the following rule:

$$\text{HARQ\_Process\_ID} = [\text{floor}(\text{CURRENT\_slot} \times 10 \times \text{nrofPDSCH}/(\text{numberOfSlotsPerFrame} \times \text{periodicity}))] \text{ modulo nrofHARQ-Processes} + \text{PDSCH\_index}$$

Here, CURRENT_slot=[(SFN×numberOfSlotsPerFrame)+slot number in the frame] is a number of a start slot of the first PDSCH in this SPS-PDSCH cycle, which is a relative number in all slots contained in a total of 1024 radio frames, where numberOfSlotsPerFrame refers to a number of slots contained in one radio frame. nrofPDSCH is a number of PDSCHs contained in one SPS-PDSCH cycle (indicated in the SPS-PDSCH configuration message), periodicity is a transmission cycle of the SPS-PDSCH (indicated in the SPS-PDSCH configuration message), nrofHARQ-Processes is a number of HARQ processes used for this SPS-PDSCH configuration (indicated in the SPS-PDSCH configuration message), and PDSCH_index is an index number of the PDSCH in this SPS-PDSCH cycle (0≤PDSCH_index<nrofPDSCH).

If the calculated HARQ_Process_ID exceeds a maximum number of HARQ processes MaxNum_HARQ_Process supported by the system, then HARQ_Process_ID=HARQ_Process_ID modulo MaxNum_HARQ_Process.

If the parameter harq-ProcID-Offset for deciding a start HARQ process number is contained in the SPS-PDSCH configuration message, then the HARQ process number of the PDSCH_index-th PDSCH in one SPS-PDSCH cycle is determined according to the following rule:

$$\text{HARQ\_Process\_ID} = [\text{floor}(\text{CURRENT\_slot} \times 10 \times \text{nrofPDSCH}/(\text{numberOfSlotsPerFrame} \times \text{periodicity}))] \text{ modulo nrofHARQ-Processes} + \text{PDSCH\_index} + \text{harq-ProcID-Offset}$$

The above parameters have the same meaning as the previous calculation formula, so they will not be repeated here.

In an alternative scheme, the uplink scheduling without grant transmission (i.e., Configured Grant PUSCH (CG-PDSCH)) has multiple PUSCHs in one cycle, which correspond to the transmission of the multiple TBs. If a parameter harq-ProcID-Offset2 for deciding a start HARQ process number is not contained in a CG-PUSCH configuration message, then a HARQ process number of the PUSCH_index-th PUSCH in one CG-PUSCH cycle is determined according to the following rule:

$$\text{HARQ\_Process\_ID} = [\text{floor}(\text{CURRENT\_symbol} \times \text{nrofPDSCH}/\text{periodicity})] \text{ modulo nrofHARQ-Processes} + \text{PUSCH\_index}$$

Here, CURRENT_symbol=(SFN×numberOfSlotsPerFrame×numberOfSymbolsPerSlot+slot number in the frame×numberOfSymbolsPerSlot+symbol number in the slot) is a number of the first symbol of the first PUSCH in this CG-PUSCH cycle, which is a relative number of all symbols contained in a total of 1024 radio frames, where numberOfSlotsPerFrame is a number of slots contained in one radio frame, and numberOfSymbolsPerSlot is a number of symbols contained in one slot. nrofPUSCH is a number of PUSCHs contained in one CG-PUSCH cycle (indicated in the CG-PUSCH configuration message), and periodicity is a transmission cycle of the CG-PUSCH (indicated in the CG-PUSCH configuration message). nrofHARQ-Processes is a number of HARQ processes used for this CG-PUSCH configuration (indicated in the CG-PUSCH configuration message), and PUSCH_index is an index number of the PUSCH in this CG-PUSCH cycle (0≤PUSCH_index<nrofPUSCH). If the calculated HARQ_Process_ID exceeds a maximum number of HARQ processes MaxNum_HARQ_Process supported by the system, then HARQ_Process_ID=HARQ_Process_ID modulo MaxNum_HARQ_Process.

If the parameter harq-ProcID-Offset for deciding a start HARQ process number is contained in the CG-PUSCH configuration message, then the HARQ process number of the PUSCH_index-th PUSCH in one CG-PUSCH cycle is determined according to the following rule:

HARQ_Process_ID=[floor(CURRENT_symbol× nrofPDSCH/periodicity)]modulo nrofHARQ-Processes+PUSCH_index+harq-ProcID-Offset The above parameters have the same meaning as the previous calculation formula, so they will not be repeated here.

In an alternative scheme, the scheduling without grant transmission supports the transmission of the multiple TBs in one cycle. A transmitting end (for example, it may be the base station and user equipment) may only use time-frequency domain resources of a part of the TBs of scheduling without grant according to a size of actually arriving data packets, and inform a receiving end (for example, it may be the user equipment and base station corresponding to the transmitting end) of the TBs with the time-frequency domain resources actually occupied, and if no data packet arrives, the transmitting end may also give up the transmission of all TBs of scheduling without grant.

For example, when the actually arriving data packet does not need to use the transmission of all TBs of scheduling without grant, the transmitting end preferentially uses time-frequency domain resources of front TBs and give up time-frequency domain resources of following TBs, which has the advantage that whether the transmission resources of the following TBs are actually occupied may be indicated by the transmission of the front TBs, so that the receiving end responds in time. In order to allow the receiving end to have enough time to decode information indicating whether the time-frequency domain resources of the subsequent TBs are actually occupied and respond, a gap between a previous TB and a following TB should meet a preset threshold.

Figure 8:
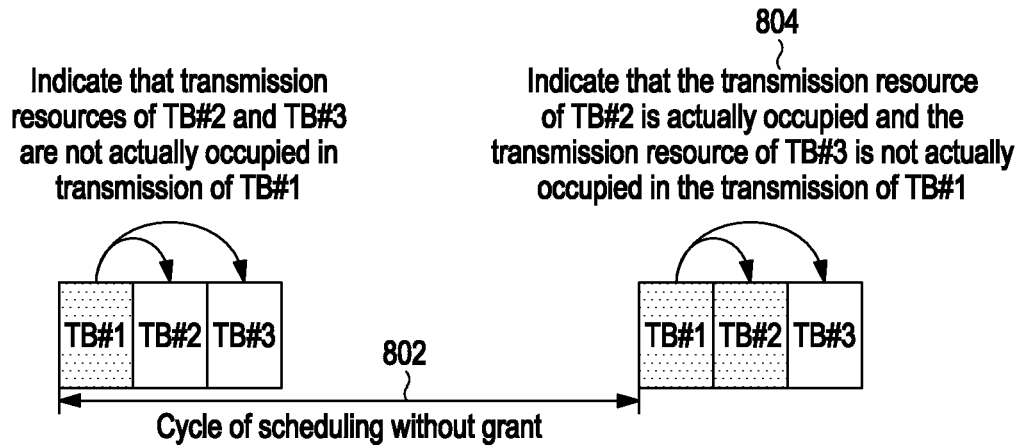
FIG. 8 illustrates a schematic diagram of utilizing the previous transport blocks to indicate whether resources of the following transport blocks are occupied according to an embodiment of the disclosure.

FIG. 8 illustrates a schematic diagram of utilizing the front transport blocks to indicate whether resources of the following transport blocks are occupied according to an embodiment of the disclosure.

Referring to FIG. 8, whether transmission resources of two subsequent TBs are actually occupied is indicated at the first TB, for example, in one cycle 802, it is indicated that transmission resources of TB #2 and TB #3 are not actually occupied in transmission of TB #1, and in another cycle 804, it is indicated that the transmission resource of TB #2 is occupied and the transmission resource of TB #3 is not actually occupied in the transmission of TB #1.

As an implementation, the indicating of whether the transmission resources of the subsequent TBs are actually occupied may include, but is not limited to, the following alternative methods: indicating whether a transmission resource of each following TB is actually occupied only by transmission of the first TB of scheduling without grant; or, indicating whether a transmission resource of a following TB is actually occupied by the transmission of a previous TB of scheduling without grant; or, indicating whether a transmission resource of each following TB is actually occupied by the transmission of a previous TB of scheduling without grant.

For downlink scheduling without grant transmission supporting the multiple TBs, if the base station indicates that a transmission resource of one of the TBs is not actually occupied, the UE may not receive scheduling without grant transmission of the corresponding TB, and the corresponding resource may be released to other UEs for use; for uplink scheduling without grant transmission supporting the multiple TBs, if the UE indicates that a transmission resource of one of the TBs is not actually occupied, the base station will not receive scheduling without grant transmission of the corresponding TB, and the corresponding resource may be released to other UEs for use.

In an example, information indicating whether the transmission resources of the subsequent TBs are actually occupied may be carried by a Media Access Control floor (Element (MAC CE). For example, the MAC CE may be contained in a media access control protocol data unit (MAC PDU) of the first TB of scheduling without grant for indicating whether the transmission resources of the subsequent TBs are actually occupied.

In another example, the information indicating whether the transmission resources of the subsequent TBs are actually occupied may be transmitted in a piggyback way, which is similar to the existing transmission mode of uplink control information piggybacked through a PUSCH, that is, the information bits may be independently encoded and occupy a part of resources of scheduling without grant according to predefined rules, and the scheduling without grant transmission avoids this part of resources by a mapping mode of rate matching. For the downlink scheduling without grant transmission, a PDSCH of the first TB of scheduling without grant carries the information indicating whether the transmission resources of the subsequent TBs are actually occupied in a piggyback way; for the uplink scheduling without grant transmission, a PUSCH of the first TB of scheduling without grant carries the information indicating whether the transmission resources of the subsequent TBs are actually occupied in a piggyback way.

In another example, the information indicating whether the transmission resources of the subsequent TBs are actually occupied may be implied by a Demodulation Reference Signal (DMRS), Cell Reference Signal (CRS) scrambling sequence, etc. For example, whether the transmission resource of the following TB is actually occupied is indicated implicitly by the DMRS or CRC scrambling sequence, etc. used by the transmission of the previous TB of the scheduling without grant transmission.

Multiple C-DRX configurations for the same serving cell are introduced below.

In the existing LTE and NR systems, the Discontinuous Reception (DRX) technology is used for power saving of the UE, and the UE may periodically stop monitoring a Physical Downlink Control Channel (PDCCH) channel for a period of time, so as to achieve the purpose of power saving. There are two kinds of DRX: RRC_Idle state-DRX and RRC_Connected state-DRX.

For the RRC_Idle state-DRX, the UE wakes up every DRX cycle to monitor a Paging Occasion (PO), that is, to monitor the PDCCH scrambled by a Paging-Radio Network Temporary Identity (P-RNTI). If the UE does not receive paging information, it may enter a sleep state until it wakes up before a PO of a next DRX cycle.

For the RRC_Connected state-DRX, the UE may discontinuously monitor the PDCCH according to established DRX operations and requirements. RRC controls an operating process of DRX by configuring some parameters, such as a DRX duration timer drx-onDurationTimer, a DRX inactivity timer drx-InactivityTimer, a DRX uplink retransmission timer drx-RetransmissionTimerUL for each uplink HARQ process, a DRX downlink retransmission timer drx-RetransmissionTimerDL for each downlink HARQ process except broadcast processes, a DRX long cycle start offset drx-LongCycleStartOffset, and selectively configuring other parameters, such as a DRX short cycle timer drx-ShortCycleTimer, a DRX short cycle drx-ShortCycle, and also defines a DRX downlink hybrid automatic repeat request round trip time timer drx-HARQ-RTT-TimerDL for each uplink HARQ process and a DRX downlink hybrid automatic repeat request round trip time timer drx-HARQ-RTT-TimerDL for each downlink HARQ process except broadcast processes. An RRC_Connected state-DRX operation may be simply referred to as C-DRX operation.

In the existing NR system, the UE may be configured with at most one C-DRX in one serving cell. However, in fact, one serving cell may support transmission of various services. Different types of services may have different transmission cycles, and arrival times of data packets may be different. Time windows of continuous arriving data packets in one transmission cycle may also be different, and sizes of actually arriving data packets may be quite different.

In order to solve the above problems, the embodiment of the disclosure provides a method performed by a user equipment, in which the UE may be configured with two or more C-DRX on one serving cell, and these C-DRX operations may be executed independently, that is, the UE is required to maintain two or more C-DRX operations in the same serving cell at the same time.

Specifically, the method performed by the user equipment includes the following steps:

Step 1: the UE receives two or more C-DRX configurations that may be used for the same serving cell.

Step 2: the UE maintains C-DRX operations corresponding to the multiple C-DRX configurations at the same time, and stops monitoring a PDCCH of this serving cell only when all C-DRX operations are in a Non-active Time, and as long as any C-DRX operation is in an Active Time, the UE is required to monitor the PDCCH of this serving cell; or, the UE further receives an activation instruction for C-DRX, which is used to activate one of the multiple C-DRX configurations, and the UE maintains a corresponding C-DRX operation according to the received activation instruction for C-DRX; or, the UE maintains the corresponding C-DRX operation according to an activated bandwidth part, that is, each C-DRX configuration corresponds to one bandwidth part (the latter two alternatives in Step 2 will be described in detail later).

The above method may use the matched DRX operation for each service, so that the UE may achieve a maximum scale of power saving effect.

In an alternative scheme, the UE is configured with two or more C-DRX on one serving cell, and each C-DRX may be configured using respective C-DRX parameters. For example, each C-DRX may use some of respective parameters, such as a DRX duration timer drx-onDurationTimer, a DRX inactivity timer drx-InactivityTimer, a DRX slot offset drx-SlotOffset, a DRX long cycle start offset drx-LongCycleStartOffset, a DRX short cycle drx-ShortCycle (optional), a DRX short cycle timer drx-ShortCycleTimer (optional) configuration, and share some of other DRX configurations, such as a DRX downlink retransmission timer drx-RetransmissionTimerDL, a DRX uplink retransmission timer drx-RetransmissionTimerUL, a DRX downlink hybrid automatic repeat request round trip time timer drx-HARQ-RTT-TimerDL and a DRX uplink hybrid automatic repeat request round trip time timer drx-HARQ-RTT-TimerUL.

In an embodiment, the UE is configured with two or more C-DRX on one serving cell, and each C-DRX configuration corresponds to a different logical channel, that is, according to a logical channel type of the transmission, a parameter configuration of a corresponding C-DRX is used when starting the DRX timer; or, each C-DRX configuration corresponds to a different radio bearer, that is, according to a radio bearer of the transmission, the parameter configuration of the corresponding C-DRX is used when starting the DRX timer; or, each C-DRX configuration corresponds to a different C-RNTI value, that is, according to a C-RNTI value of the transmission, the parameter configuration of the corresponding C-DRX is used when starting the DRX timer; or, each C-DRX configuration corresponds to a different priority, which refers to a priority of the physical layer, and the parameter configuration of the corresponding C-DRX is used when starting the DRX timer.

It can be understood that the above embodiment is only an example embodiment, and the disclosure includes various variants of the above embodiment, for example, some steps may be added or omitted or replaced, for example, Step 2 in the above method performed by the user equipment may be replaced.

For example, in another alternative scheme, although there are two or more C-DRX configurations in the same serving cell, the UE may maintain only one C-DRX operation at the same time, and the base station may activate one of the C-DRX configurations by a MAC CE or DCI, that is, the system may adaptively change the C-DRX configuration by a MAC CE or DCI instruction. When the UE receives an activation instruction of the C-DRX configuration, it may enable a new C-DRX configuration, and timers that have been run in previous C-DRX operations all stop or continue running. For example, the base station may indicate whether the timers that have been run in the previous C-DRX operations continue running through additional signaling.

In yet another alternative scheme, the UE may be configured with one C-DRX on each Bandwidth Part (BWP), that is, each BWP corresponds to respective C-DRX configurations. When the UE switches from a first BWP to a second BWP, the UE should automatically use a C-DRX configuration corresponding to the second BWP, and timers that have been run on the first BWP before the switching continue running on the second BWP after the switching or are all stopped. For example, the base station may indicate whether the timers that have been run on the first BWP before the switching continue being run through additional signaling. In an example, only a downlink BWP has respective corresponding C-DRX configurations, that is, only if the downlink BWP is switched, the UE changes the used C-DRX configuration, and if an uplink BWP is switched, the UE is not required to change the used C-DRX configuration, that is, the C-DRX configuration corresponds to the downlink BWP.

It can be understood that the disclosure is not limited to this and will not be repeated here.

Adaptive C-DRX parameter configurations in a Discontinuous Reception (DRX) scenario are introduced below.

In the existing C-DRX operation, the parameters of C-DRX are pre-configured through higher-layer signaling, that is, values of the C-DRX timers are all semi-statically fixed, and such semi-statically fixed C-DRX timers may not be suitable for dynamically changing service types. For example, a duration of arrival of the data packets of different types of services may be different, so different sizes of the DRX inactivity timer drx-InactivityTimer may be required.

In order to solve the above problems, the embodiment of the disclosure provides a method performed by a user equipment, in which one parameter of C-DRX may have a configuration of multiple values, and which value to be used specifically may be further indicated by a MAC CE or DCI, or each value corresponds to a different case respectively, for example, different drx-InactivityTimer values may be used for the PDCCH in different cases.

Specifically, the method performed by the user equipment includes the following steps:

Step 1: the UE receives the configuration of multiple values for one C-DRX parameter.

Step 2: the UE receives an activation instruction of the C-DRX parameter, which is used to activate one of the above multiple values, and the UE enables a corresponding value of the C-DRX parameter according to the received activation instruction of the C-DRX parameter; or, the UE starts the corresponding value of the C-DRX parameter according to a certain attribute of the received PDCCH.

It can be understood that the above embodiment is only an example embodiment, and the disclosure includes various variants of the above embodiment, for example, some steps may be added or omitted or replaced, for example, steps in the methods performed by the user equipment provided by other embodiments in the disclosure may be added in the method performed by the user equipment in the above embodiment, for example, a new embodiment may be formed by combining with two or more C-DRX configurations in the previous embodiment, and it can be understood that the disclosure is not limited to this and will not be repeated here.

In an alternative scheme, one C-DRX parameter may be configured with two or more values, and which value to be used may be further indicated by the MAC CE or DCI. The above C-DRX parameter may be at least one of a DRX duration timer drx-onDurationTimer, a DRX inactivity timer drx-InactivityTimer, a DRX slot offset drx-SlotOffset, a DRX long cycle start offset drx-LongCycleStartOffset, a DRX short cycle drx-ShortCycle, a DRX short cycle timer drx-ShortCycleTimer, a DRX downlink retransmission timer drx-RetransmissionTimerDL, a DRX uplink retransmission timer drx-RetransmissionTimerUL, a DRX downlink hybrid automatic repeat request round trip time timer drx-HARQ-RTT-TimerDL and a DRX uplink hybrid automatic repeat request round trip time timer drx-HARQ-RTT-TimerUL.

In an example, the drx-InactivityTimer is configured with multiple different values. For the received PDCCH scheduling a new transmission, the UE starts or restarts the corresponding drx-InactivityTimer at the first symbol after the PDCCH according to a dedicated indication field in the DCI carried by the PDCCH. The DCI indication field is used to explicitly indicate which drx-InactivityTimer to be started; or, the DCI indication field is used to implicitly indicate which drx-InactivityTimer to be started, for example, indicating which service type the scheduling belongs to, and then starting the corresponding drx-InactivityTimer according to the service type, wherein a drx-InactivityTimer configuration should be associated with the corresponding service type. It can be understood that the above C-DRX timer is not limited to the drx-InactivityTimer, but may also be other C-DRX timers, for example, it is also applicable to the drx-RetransmissionTimerDL and drx-RetransmissionTimerUL, etc.

In another alternative scheme, when the above C-DRX parameter is the drx-InactivityTimer, the drx-InactivityTimer may be configured with two or more values, and each value is used for the PDCCH in different cases, for example, it may be any of the following cases:

(1) for the received PDCCH scheduling a new transmission, the UE starts or restarts the corresponding drx-InactivityTimer at the first symbol after the PDCCH according to a DCI format used by the PDCCH. That is, the drx-InactivityTimer should be configured for each DCI format respectively.

(2) for the received PDCCH scheduling a new transmission, the UE starts or restarts the corresponding drx-InactivityTimer at the first symbol after the PDCCH according to a C-RNTI value used by the PDCCH. That is, the drx-InactivityTimer should be configured for each RNTI value respectively.

(3) for the received PDCCH scheduling a new transmission, the UE starts or restarts the corresponding drx-InactivityTimer at the first symbol after the PDCCH according to a PDCCH search space where the PDCCH is located. That is, the drx-InactivityTimer should be configured for each PDCCH search space respectively.

(4) for the received PDCCH scheduling a new transmission, the UE starts or restarts the corresponding drx-InactivityTimer at the first symbol after the PDCCH according to a Control Resource Set (CORESET) where the PDCCH is located. That is, the drx-InactivityTimer should be configured for each CORESET respectively.

(5) for the received PDCCH scheduling a new transmission, the UE starts or restarts the corresponding drx-InactivityTimer at the first symbol after the PDCCH according to a BWP where the PDCCH is located. That is, the drx-InactivityTimer should be configured for each BWP respectively.

(6) for the received PDCCH scheduling a new transmission, the UE starts or restarts the corresponding drx-InactivityTimer at the first symbol after the PDCCH according to whether data scheduled by the PDCCH is uplink or downlink. That is, the drx-InactivityTimer should be configured for uplink and downlink respectively.

According to the above description, different types of services may be distinguished by features such as the dedicated indication field in the DCI, the DCI format, the RNTI value used for PDCCH scrambling, or the search space of the PDCCH, that is, the UE may start the corresponding drx-InactivityTimer according to the used features of a PDCCH indicating a new transmission, thus realizing power saving of the user equipment.

In yet another alternative scheme, the base station dynamically and adaptively reconfigures the value of the C-DRX parameter by the MAC CE or DCI, and the reconfigured value of the C-DRX parameter may only be used for the first C-DRX cycle after the MAC CE or DCI, that is, the base station only modifies the value of the C-DRX parameter of the current first C-DRX cycle by the MAC CE or DCI, and the C-DRX parameter of a subsequent C-DRX cycle may follow previous values configured by the RRC layer; or, the reconfigured value of the C-DRX parameter may be used for the first to N-th C-DRX cycles after the MAC CE or DCI, where N is a predefined or pre-configured value; or, the reconfigured value of the C-DRX parameter may be used for all C-DRX cycles after the MAC CE or DCI until the value of the C-DRX parameter is reconfigured.

In yet another alternative scheme, the base station dynamically and adaptively reconfigures a value of the C-DRX parameter drx-onDurationTimer by the MAC CE or DCI, for example, the base station adaptively configures a drx-onDurationTimer value of the UE in a next C-DRX cycle by the MAC CE or DCI. In order to save signaling overhead, the drx-onDurationTimer value configured by the RRC layer may be used as a reference to indicate a change amount of the drx-onDurationTimer value in the next C-DRX cycle, that is, to indicate the amount by which the drx-onDurationTimer becomes larger or smaller. In other words, the drx-onDurationTimer value of each C-DRX cycle may be different, which is different from the existing C-DRX mechanism that periodically uses the same drx-onDurationTimer value, and can better adapt to change of the services.

Similarly, the C-DRX parameter that may be dynamically and adaptively reconfigured by the MAC CE or DCI may also be at least one of drx-InactivityTimer, drx-SlotOffset, drx-LongCycleStartOffset, drx-ShortCycle, drx-ShortCycleTimer, drx-RetransmissionTimerDL, drx-RetransmissionTimerUL, drx-HARQ-RTT-TimerDL and drx-HARQ-RTT-TimerUL.

In yet another alternative scheme, the base station dynamically and adaptively reconfigures values of the C-DRX parameters drx-SlotOffset and/or drx-LongCycleStartOffset by the MAC CE or DCI, for example, the base station adaptively configures a position where the UE starts a drx-onDurationTimer in the next C-DRX cycle by the MAC CE or DCI, that is, the position where the UE starts to monitor the PDCCH in the next C-DRX cycle. In the current system, the UE periodically starts the drx-onDurationTimer at a fixed position in each C-DRX cycle, and the position for starting the drx-onDurationTimer is determined by the C-DRX parameters drx-SlotOffset and drx-LongCycleStartOffset pre-configured by the higher layer. In order to save signaling overhead, the base station may indicate the UE to advance or delay starting of the drx-onDurationTimer in the next C-DRX cycle for a period of time, which is, advancing or delaying relative to an original position where the drx-onDurationTimer is started.

Figure 9A:
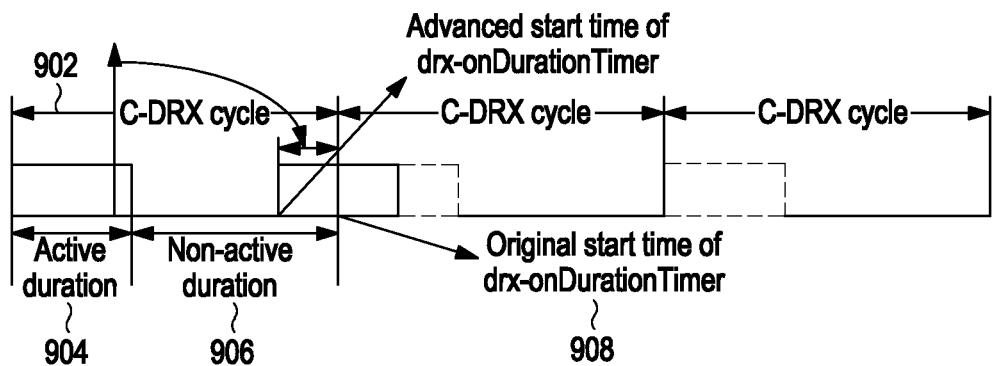
FIG. 9A illustrates a schematic diagram of a start time of a DRX duration timer drx-onDurationTimer according to an embodiment of the disclosure.

FIG. 9A illustrates a schematic diagram of a start time of a timer drx-onDurationTimer according to an embodiment of the disclosure.

Referring to FIG. 9A, a C-DRX cycle 902 may include an active time duration 904 and a non-active time duration 906. The UE may continuously monitor a PDCCH within the active time duration 904 and stops monitoring the PDCCH within the non-active time duration 906. The UE may periodically start the drx-onDurationTimer at a fixed position (e.g., a position 908) in each C-DRX cycle. In order to cope with a jitter at an arrival moment of a service, the base station may indicate the UE to advance or delay the start position 908 of the drx-onDurationTimer in a next DRX cycle through dedicated signaling, for example, the dedicated signaling may be carried by a MAC CE or DCI.

Figure 9B:
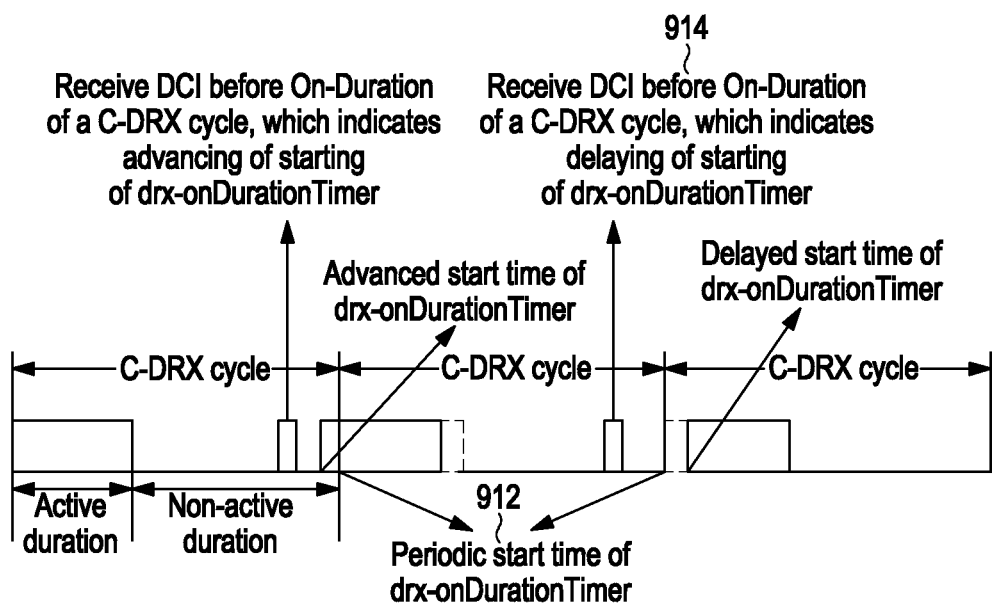
FIG. 9B illustrates a schematic diagram of a start time of a DRX duration timer drx-onDurationTimer according to an embodiment of the disclosure.

FIG. 9B illustrates a schematic diagram of a start time of a timer drx-onDurationTimer according to an embodiment of the disclosure.

Referring to FIG. 9B, the start time (e.g., positions 912) of the drx-onDurationTimer is indicated to be advanced or delayed by the DCI 914 before OnDuration. For example, the DCI 914 is configured to contain an indication field by higher-layer signaling for indicating that the start time of the corresponding drx-onDurationTimer is advanced or delayed by x slots or symbols, wherein a set for adjusting a value of x is configured by higher-layer signaling, and which value x is used is further indicated by the DCI.

The above DCI used to carry the indication signaling for the start time of the drx-onDurationTimer may be DCI format 2-6 used for Power Saving in the existing system, which is scrambled by a PS-RNTI, and the UE starts to monitor DCI format 2-6 at a first gap position before OnDuration of each DRX cycle, wherein the first gap position is pre-configured by higher-layer signaling. According to configuration information of a PDCCH search space for transmitting DCI format 2-6, the UE only monitors a PDCCH in a slot with a PDCCH transmission occasion until it stops monitoring DCI format 2-6 at a second gap position before OnDuration, wherein the second gap position is related to UE capability, and the second gap is a minimum time required for PDCCH decoding and starting preparation of the drx-onDurationTimer, and the UE is required to report this capability to the base station.

Whether to interpret the DCI field used to indicate the start time of the drx-onDurationTimer is related to an interpretation result of a Wake-up Indication field contained in the DCI format 2-6, which is used to indicate whether to start the corresponding drx-onDurationTimer. Therefore, only when the wake-up indication field indicates that it is necessary to start the drx-onDurationTimer, the DCI field for indicating the start time of the drx-onDurationTimer is further interpreted. If the wake-up indication field indicates that it is not necessary to start the drx-onDurationTimer, the DCI field for indicating the start time of the drx-onDurationTimer may be in a reserved state or an indication for other information.

In addition, DCI format 2-6 may also contain DCI fields for adjusting other DRX parameters, for example, a DCI field for adjusting a duration OnDuration (i.e. parameter drx-onDurationTimer), a DCI field for adjusting a parameter drx-InactivityTimer, etc.

In yet another alternative scheme, the base station indicates the UE to start the timer drx-onDurationTimer again in the current C-DRX cycle through dedicated signaling, that is, to start monitoring the PDCCH. Here, the UE may start the drx-onDurationTimer twice in one C-DRX cycle, wherein the starting of the drx-onDurationTimer for the first time is a regular periodic starting in each C-DRX cycle, and a position where the drx-onDurationTimer is started for the first time is determined by the C-DRX parameters (drx-SlotOffset and drx-LongCycleStartOffset) pre-configured by the higher layer. The starting of the drx-onDurationTimer for the second time is triggered by a dedicated instruction, and the position where the drx-onDurationTimer is started for the second time may be determined by the above dedicated signaling, for example, the UE starts the drx-onDurationTimer at a position of a preset gap after receiving the dedicated signaling.

Figure 10:
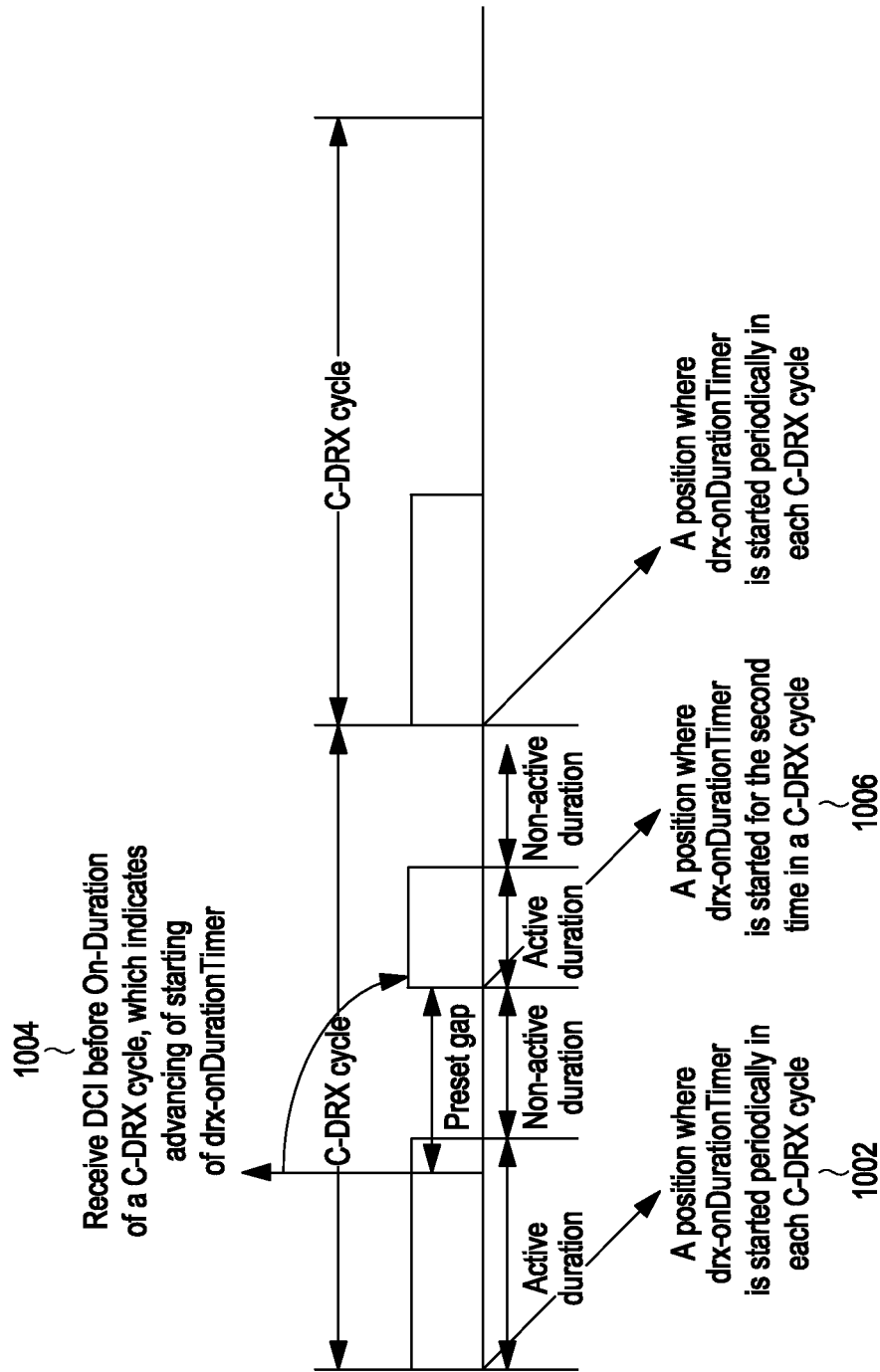
FIG. 10 illustrates another schematic diagram of a start time of a DRX duration drx-onDurationTimer according to an embodiment of the disclosure.

FIG. 10 illustrates another schematic diagram of a start time of a timer drx-onDurationTimer according to an embodiment of the disclosure.

Figure 11:
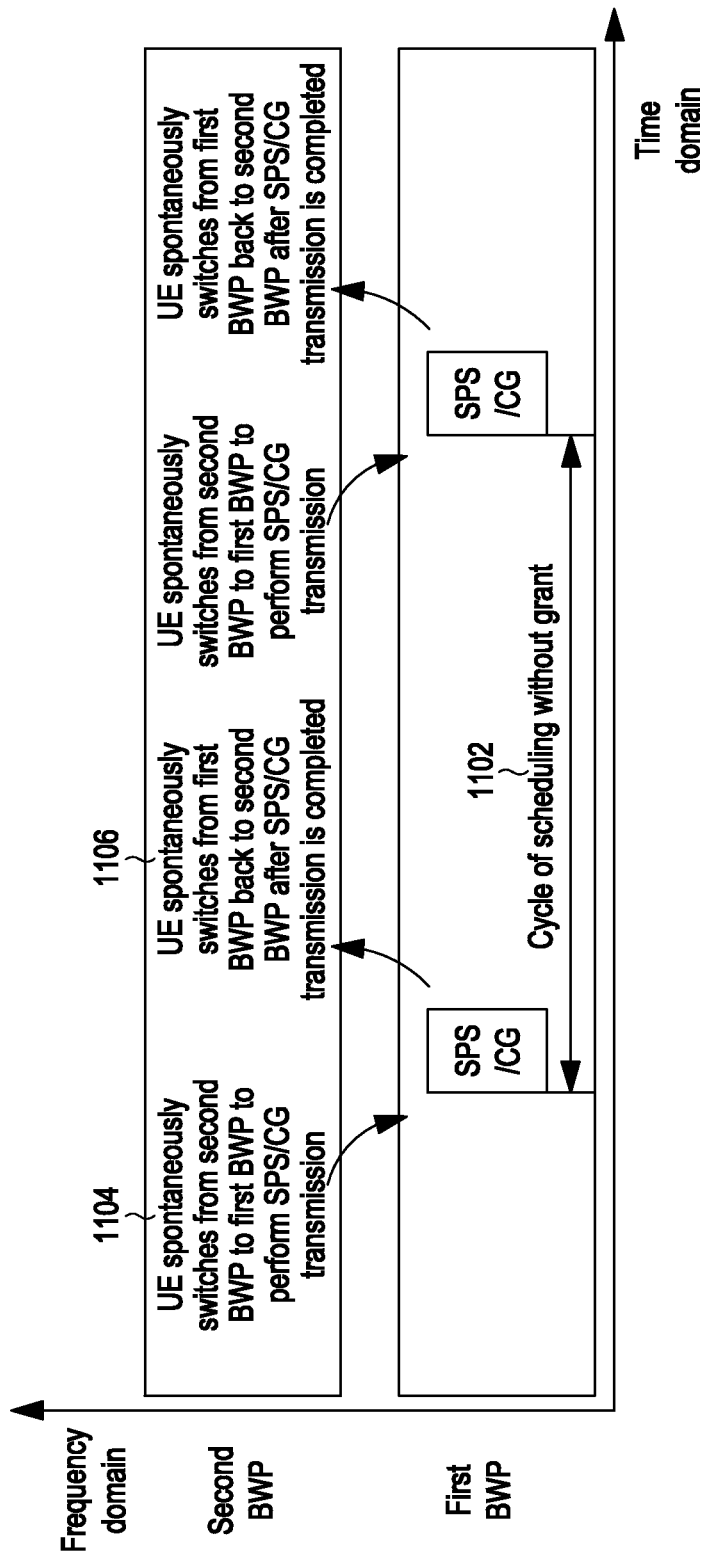
FIG. 11 illustrates a schematic diagram of a method performed by a user equipment according to an embodiment of the disclosure.

FIG. 11 illustrates a schematic diagram of a method performed by a user equipment according to an embodiment of the disclosure.

Referring to FIG. 10, a DRX cycle includes an active time duration and a non-active time duration. The UE may continuously monitor the PDCCH within the active time duration and stops monitoring the PDCCH within the non-active time duration. The UE may periodically start the drx-onDurationTimer at a fixed position (e.g., a position 1002) in each DRX cycle. In order to cope with burst service transmission, the base station may indicate the UE to additionally start the drx-onDurationTimer once more in one DRX cycle through dedicated signaling 1004. For example, the UE may start drx-onDurationTimer at a position (e.g., a position 1006) of a preset gap after receiving the dedicated signaling 1004, wherein the preset gap may be indicated in the dedicated signaling 1004 and the dedicated signaling 1004 may be carried by a MAC CE or DCI. A value of the drx-onDurationTimer started for the second time and a value of the drx-onDurationTimer started for the first time may be the same value; or, the value of the drx-onDurationTimer started for the second time and the value of the drx-onDurationTimer started for the first time may be different values. In order to distinguish it, the drx-onDurationTimer started for the second time may also be called drx-onDurationTimer-Additional, which is a different parameter from the drx-onDurationTimer started for the first time.

A scenario where the starting of the drx-InactivityTimer is triggered by scheduling without grant transmission is described below.

In the existing C-DRX operation, if a MAC PDU is received through downlink scheduling without grant, the UE starts the drx-HARQ-RTT-TimerDL corresponding to a HARQ process at the first symbol after a corresponding HARQ feedback transmission, and stops the drx-RetransmissionTimerDL corresponding to the HARQ process. If this MAC PDU is not successfully decoded, after expiration of the drx-HARQ-RTT-TimerDL, the UE is required to start the drx-RetransmissionTimerDL corresponding to HARQ process, that is, to enter a PDCCH monitoring mode.

However, in fact, for scheduling without grant transmission, there may be not only the demand of corresponding retransmission, but also the demand of transmission of new transport blocks that follow. For example, in XR services, a size of data that arrives periodically may not be fixed, but fluctuate within a certain range. One of the schemes is to allocate transmission resources for scheduling without grant according to a maximum possible amount of data that may arrive, so that no matter how large an amount of actually arriving data is, it can be transmitted in one transport block, but if the amount of actually arriving data is very small, the transmission efficiency will be very low; or, the second one of the schemes is to allocate the transmission resources for scheduling without grant according to an average or minimum value of the amount of the arriving data, and if the amount of the actually arriving data cannot be transmitted in one transport block, it may continue to be transmitted with a new transport block through dynamic scheduling after the scheduling without grant transmission. In order to enable the UE to monitor the dynamic scheduling of the new transport block after receiving or transmitting the scheduling without grant transmission, the UE is required to monitor the PDCCH, that is, the scheduling without grant transmission may trigger the starting or restarting of the drx-InactivityTimer.

The embodiment of the disclosure provides a method performed by a user equipment, in which scheduling without grant transmission may trigger starting or restarting of drx-InactivityTimer.

Specifically, the method performed by the user equipment includes the following steps:

Step 1: the UE receives or transmits scheduling without grant transmission that may indicate whether there is dynamic scheduling new data transmission in the follow-up.

Step 2: the UE starts or restarts drx-InactivityTimer at the first symbol after the scheduling without grant transmission, if the scheduling without grant transmission indicates that there is the dynamic scheduling new data transmission in the follow-up. For uplink scheduling without grant, considering the transmission delay and the processing time of a base station, the UE may start or restart the drx-InactivityTimer at the first symbol after a preset gap after transmitting uplink scheduling without grant transmission.

The above method provides a new mechanism for starting or restarting the drx-InactivityTimer, so that the drx-InactivityTimer may be started or restarted by determining whether the scheduling without grant transmission indicates whether there is the dynamic scheduling new data transmission in the follow-up.

It can be understood that the above embodiment is only an example embodiment, and the disclosure includes various variants of the above embodiment, for example, some steps may be added or omitted or replaced, for example, steps in the methods performed by the user equipment provided by other embodiments in the disclosure may be added in the method performed by the user equipment in the above embodiment, for example, it may be implemented after Step 3 of the first implementation to form a new embodiment, certainly, the disclosure is not limited to this.

In an alternative scheme, information indicating whether there is the dynamic scheduling new data transmission in the follow-up may be carried by a MAC CE, which may be contained by a MAC PDU for the scheduling without grant transmission. In another alternative scheme, the information indicating whether there is the dynamic scheduling new data transmission in the follow-up may be implicitly carried by a DMRS or CRC scrambling for the scheduling without grant transmission.

For downlink scheduling without grant transmission, if a MAC PDU is received through the downlink scheduling without grant transmission, and the MAC PDU contains a MAC CE for indicating that there is the dynamic scheduling new data transmission in the follow-up, or a DMRS or CRC scrambling of a PDSCH carrying the MAC PDU implicitly indicates that there is the dynamic scheduling new data transmission in the follow-up, the UE starts the drx-InactivityTimer at the first symbol after transmission of the MAC PDU.

For the uplink scheduling without grant transmission, if a MAC PDU is transmitted through the uplink scheduling without grant transmission, and the MAC PDU contains a MAC CE for indicating that there is the dynamic scheduling new data transmission in the follow-up, or a DMRS or CRC scrambling of a PUSCH carrying the MAC PDU implicitly indicates that there is the dynamic scheduling new data transmission in the follow-up, the UE starts drx-HARQ-RTT-TimerUL at the first symbol after transmission of the MAC PDU, and starts the drx-InactivityTimer after expiration of the drx-HARQ-RTT-TimerUL, because the base station can transmit the PDCCH for dynamically scheduling subsequent new data transmission only after receiving the MAC PDU.

The above drx-InactivityTimer triggered by the scheduling without grant transmission and the existing drx-InactivityTimer triggered by the PDCCH indicating new data transmission may be the same value; or, the drx-InactivityTimer triggered by the scheduling without grant transmission and the existing drx-InactivityTimer triggered by the PDCCH indicating new data transmission may be different values, and the drx-InactivityTimer triggered by the scheduling without grant transmission may be an extra configured parameter dedicated for the scheduling without grant, which may also be called drx-SPS-InactivityTimer or drx-CG-InactivityTimer, and is a different parameter from the existing drx-InactivityTimer triggered by the PDCCH indicating new data transmission.

Related contents of Bandwidth Part (BWP) switch in the scheduling without grant transmission is described below.

The existing NR system supports flexible Bandwidth Part (BWP) switching technology, and the base station may adaptively adjust a downlink reception bandwidth and/or uplink transmission bandwidth of the UE according to the real-time situation, thus effectively reducing the power consumption of the UE. For example, when traffic of the UE is large, the base station may configure a larger bandwidth for the UE; when the traffic of the UE is small, the base station may configure a smaller bandwidth for the UE. The base station may indicate the UE to perform BWP switch by a BWP switch instruction, for example, the BWP switch is indicated by a BWP field contained in DCI for indicating scheduling information. The UE may be configured with up to 4 BWPs for adaptive BWP switch, and only one BWP may be used by the UE at one point in time, which is called an active BWP.

When the base station indicates the UE to switch from a first bandwidth part to a second bandwidth part, for the downlink scheduling without grant transmission and uplink scheduling without grant transmission of Type 2, activated scheduling without grant transmission on the first bandwidth part is deactivated by default, and the scheduling without grant transmission configured on the first bandwidth part is activated only after the base station indicates the UE to switch back to the first bandwidth part again and receives active DCI for the scheduling without grant transmission; for uplink scheduling without grant transmission of Type 1, the scheduling without grant transmission configured on the first bandwidth part is deactivated by default after switching off, and the scheduling without grant transmission configured on the first bandwidth part is activated by default after switching back to the first bandwidth part. In other words, scheduling without grant transmission on a non-active BWP is also non-active. Although the base station may indicate the UE to switch back to the first bandwidth part to perform the scheduling without grant transmission by the BWP switch instruction, there will be periodic signaling overhead.

In order to solve the above problems, the embodiment of the disclosure provides a method performed by a user equipment, in which the scheduling without grant transmission may be configured to be in an active state after the UE is off the BWP where it is located, that is, the scheduling without grant transmission on the non-active BWP may be active, and at each transmission moment of the scheduling without grant, the UE may switch from the active BWP back to the BWP where the scheduling without grant transmission is located to perform the scheduling without grant transmission, and then switch back to the previous active BWP.

The method is described in detail below in conjunction with FIG. 11, which illustrates a schematic diagram of a method performed by a user equipment according to an embodiment of the disclosure. SPS/CG in the drawing refers to Semi-Persistent Scheduling transmission/Configured Grant scheduling transmission, which has the same meaning as scheduling without grant transmission herein.

Specifically, the method performed by the user equipment includes the following steps:

Step 1: the UE may receive indication information for indicating whether scheduling without grant transmission on a current non-active bandwidth part is in an active state.

Step 2: the UE may decide whether to switch from an active BWP to a non-active BWP where the scheduling without grant transmission is located to perform the scheduling without grant transmission before each transmission moment of the scheduling without grant transmission on the current non-active bandwidth part, if the information indicates that the scheduling without grant transmission on the current non-active bandwidth part is in the active state.

Referring to FIG. 11, the current non-active BWP where the scheduling without grant transmission is located is a first BWP, and a current active BWP is a second BWP. The UE may decide whether to switch from the second BWP to the first BWP to perform the scheduling without grant transmission before a scheduling without grant transmission moment in one cycle 1102. If the scheduling without grant transmission on the first BWP does not conflict with transmission on the second BWP, the UE may switch to the first BWP; if the scheduling without grant transmission on the first BWP conflicts with the transmission on the second BWP, the UE may decide whether to switch to the first BWP according to a priority of the transmission. For example, if a priority of the transmission on the second BWP is higher than a preset threshold and/or higher than a priority of the scheduling without grant transmission on the first BWP, the UE is not required to switch to the first BWP, otherwise, the UE is required to switch to the first BWP.

Step 3: the UE may switch from the second BWP to the first BWP at a position 1104, and performs pre-configured scheduling without grant transmission on the first BWP, if the UE decides to switch to the first BWP.

Step 4: the UE may switch from the first BWP back to the second BWP at a position 1106 after the scheduling without grant transmission on the first BWP is completed.

It can be understood that the above embodiment is only an example embodiment, and the disclosure includes various variants of the above embodiment, for example, some steps may be added or omitted or replaced.

In the embodiment, without BWP switch instruction, the UE may spontaneously switch from the second BWP to the first BWP to perform the scheduling without grant transmission before each transmission moment of the scheduling without grant transmission, and then spontaneously switch from the first BWP to the second BWP after the scheduling without grant transmission on the first BWP is completed, thus reducing the periodic signaling overhead for indicating the BWP switch.

In the embodiment, for uplink scheduling without grant transmission, if the UE has no data to be transmitted at the scheduling without grant transmission moment of the first BWP, the UE may stay on the second BWP without switching from the second BWP to the first BWP.

In an alternative embodiment, the completing of the scheduling without grant transmission on the first BWP by the UE includes completing retransmission of the scheduling without grant transmission on the first BWP, that is, the retransmission of the scheduling without grant transmission on the first BWP must also be transmitted on the first BWP. For example, the UE may spontaneously switch back to the second BWP at a moment of a preset gap after the scheduling without grant transmission, the preset gap may enable the UE to have enough time to complete the retransmission of the scheduling without grant transmission on the first BWP. In another alternative embodiment, the completing of the scheduling without grant transmission on the first BWP by the UE does not include completing the retransmission of the scheduling without grant transmission on the first BWP, that is, the retransmission of the scheduling without grant transmission on the first BWP may be transmitted on the second BWP. For example, for downlink scheduling without grant transmission, the UE may switch from the first BWP to the second BWP after transmitting a corresponding HARQ feedback on the first BWP, and if the downlink scheduling without grant transmission is not successfully decoded by the UE, the UE may receive retransmission of the downlink scheduling without grant transmission on the second BWP; for the uplink scheduling without grant transmission, the UE may switch from the first BWP back to the second BWP after transmitting the uplink scheduling without grant transmission on the first BWP, and if the uplink scheduling without grant transmission is not successfully decoded by the base station, the UE may retransmit the uplink scheduling without grant transmission on the second BWP.

In an example, after the UE completes the scheduling without grant transmission on the first BWP, the base station indicates the UE to switch from the first BWP back to the second BWP by an instruction, and the UE switches from the first BWP back to the second BWP immediately after receiving the instruction.

In an example, the UE switches from the first BWP back to the second BWP immediately after a preset time window after switching from the second BWP to the first BWP, and a configuration of a length of the preset time window should ensure that the UE may complete the scheduling without grant transmission on the first BWP.

In an example, the UE switches from the first BWP back to the second BWP immediately after completing the scheduling without grant transmission on the first BWP.

In an example, the UE switches from the first BWP back to the second BWP immediately after a preset time window after completing the scheduling without grant transmission on the first BWP.

In an example, the UE switches from the first BWP back to the second BWP immediately after transmitting a HARQ feedback for the downlink scheduling without grant transmission on the first BWP.

In an example, the UE switches from the first BWP back to the second BWP immediately after a preset time window after transmitting a HARQ feedback for the downlink scheduling without grant transmission on the first BWP.

In an example, the UE switches from the first BWP back to the second BWP immediately after receiving a HARQ feedback for the uplink scheduling without grant transmission on the first BWP.

In an example, the UE switches from the first BWP back to the second BWP immediately after a preset time window after receiving a HARQ feedback for the uplink scheduling without grant transmission on the first BWP;

In an example, the UE switches from the first BWP back to the second BWP immediately, after the UE transmits a HARQ feedback for the downlink scheduling without grant transmission on the first BWP and the downlink scheduling without grant transmission is successfully decoded by the UE;

In an example, the UE switches from the first BWP back to the second BWP immediately, after receiving a HARQ feedback for the uplink scheduling without grant transmission on the first BWP and if the HARQ feedback indicates that the uplink scheduling without grant transmission is successfully decoded by the base station.

In the current NR system, DCI indicating the BWP switch is mainly used for data scheduling, that is, only when there is data scheduling, can the BWP switch be indicated by the DCI, which may not be suitable for performing the scheduling without grant transmission by the BWP switch. In an alternative embodiment, a DCI dedicated to indicating the BWP switch is defined, which is not used for the data scheduling, that is, the BWP switch may also be indicated by the DCI without data scheduling.

In another alternative embodiment, the base station indicates whether the UE is required to switch from the second BWP (active BWP) to the first BWP (non-active BWP) to perform the scheduling without grant transmission through dedicated signaling (e.g., a dedicated instruction 1204), which may be carried by DCI or a physical layer signal sequence. Compared with the existing DCI for indicating the BWP switch, the main difference is that the UE is required to monitor the dedicated signaling at a specific moment or window, and even if the UE is in a non-active time of C-DRX at that time or window, it is required to wake up to monitor the dedicated signaling. The dedicated signaling is transmitted on the second BWP, and a time or window position for transmitting the dedicated signaling has a binding relationship with the scheduling without grant transmission moment on the first BWP, for example, the time or window position for transmitting the dedicated signaling is a position of a preset gap (e.g., a gap 1206) before a scheduling without grant transmission moment. In addition, the dedicated signaling may indicate the UE to switch from the second BWP to the first BWP in a current cycle (e.g., a cycle of scheduling without grant 1202) to perform the scheduling without grant transmission, that is, one dedicated signaling corresponds to scheduling without grant transmission in one cycle; or, the dedicated signaling may indicate that in the next N cycles, the UE switches from the second BWP to the first BWP to perform the scheduling without grant transmission before a scheduling without grant transmission moment in each cycle, that is, one dedicated signaling corresponds to scheduling without grant transmission in N cycles. The UE may spontaneously switch from the first BWP back to the second BWP after completing the scheduling without grant transmission on the first BWP.

Figure 12:
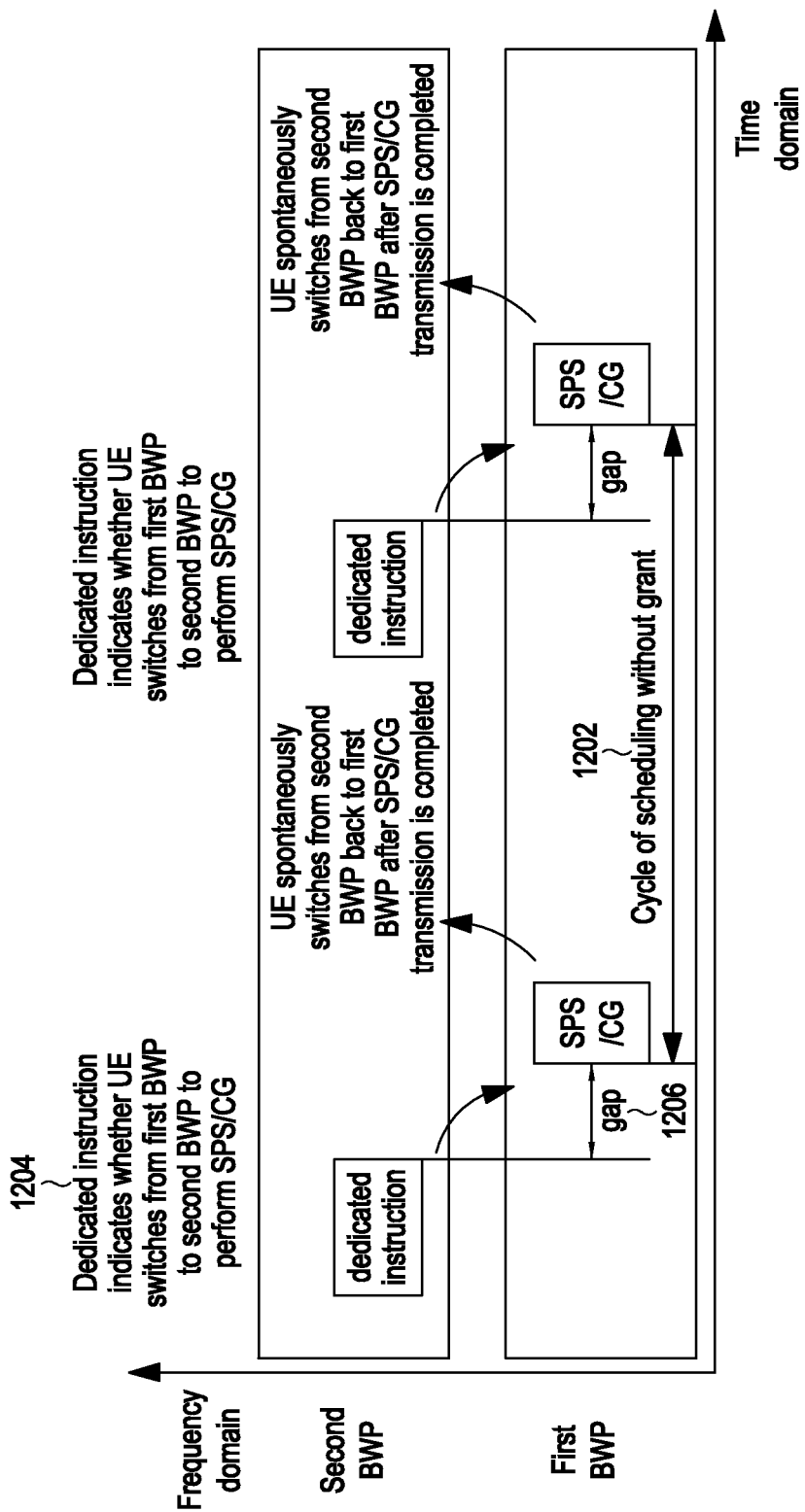
FIG. 12 illustrates a schematic diagram of a method performed by a user equipment according to an embodiment of the disclosure.

FIG. 12 illustrates an example of a similar process to FIG. 11 according to an embodiment of the disclosure.

Figure 13:
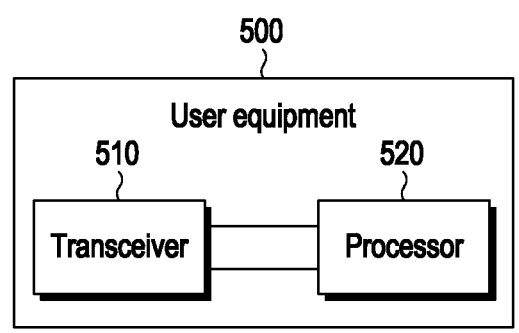
FIG. 13 is a block diagram illustrating a structure of a user equipment 500 according to an embodiment of the disclosure.

FIG. 13 is a block diagram illustrating a structure of a user equipment 500 according to an embodiment of the disclosure.

Referring to FIG. 13, the user equipment 500 may include a transceiver 510 and a processor 520. The transceiver 510 may be configured to transmit and receive signals to and from the outside. The processor 520 may be configured to perform any of the above methods performed by the user equipment. The user equipment 500 may be implemented in a form of hardware, software or a combination of hardware and software, so that it \ may perform the above methods performed by the user equipment described in the disclosure.

At least one embodiment of the disclosure also provides a non-transitory computer-readable recording medium having programs stored thereon, which are used to, when executed by a computer, perform the above methods.

According to an aspect of the disclosure, there is provided a method performed by a user equipment, including: receiving information related to scheduling without grant or information related to Radio Resource Control (RRC) Connected state-Discontinuous Reception (C-DRX), and performing an operation related to scheduling without grant or an operation related to C-DRX correspondingly, based on the received information.

According to the method performed by the user equipment provided by the disclosure, wherein the information related to scheduling without grant includes configuration information for configuring that multiple transport blocks may be transmitted in one cycle, the configuration information including at least one of: a number of multiple transport blocks that may be transmitted in one cycle; or a gap of each transport block of the multiple transport blocks relative to a previous transport block; or a gap of each transport block of the multiple transport blocks relative to the first transport block; or a corresponding time-frequency domain resource configured for each transport block of the multiple transport blocks respectively.

According to the method performed by the user equipment provided by the disclosure, wherein a time-frequency domain resource allocation mode of the multiple transport blocks includes any one of: using of same frequency domain resources and continuous slots by the multiple transport blocks; or using of same frequency domain resources and discontinuous slots by the multiple transport blocks; or using of different frequency domain resources and continuous slots by the multiple transport blocks; or using of different frequency domain resources and discontinuous slots by the multiple transport blocks.

According to the method performed by the user equipment provided by the disclosure, wherein Hybrid Automatic Repeat Request (HARQ) process numbers corresponding to the multiple transport blocks are continuous.

According to the method performed by the user equipment provided by the disclosure, wherein the performing the operation related to scheduling without grant includes: performing scheduling without grant transmission on a time-frequency domain resource of one or more first transport blocks in the multiple transmissions, wherein the scheduling without grant transmission indicates whether a time-frequency domain resource of one or more second transport blocks in the multiple transmissions is used, wherein the second transport block is after the first transport block.

According to the method performed by the user equipment provided by the disclosure, wherein whether the time-frequency domain resource of the one or more second transport blocks of the multiple transport blocks is used is indicated by at least one of: indicating, by the first transport block of the multiple transport blocks, whether a time-frequency domain resource of each transport block except the first transport block of the multiple transport blocks is used; or indicating, by each transport block of the multiple transport blocks, whether a time-frequency domain resource of a next transport block of the transport block is used; or indicating, by each transport block of the multiple transport blocks, whether a time-frequency domain resource of each of the following subsequent transport blocks of the transport block is used.

According to the method performed by the user equipment provided by the disclosure, wherein the performing the operation related to scheduling without grant includes: performing scheduling without grant transmission containing information related to dynamic scheduling new data transmission; and determining to start or restart a drx-InactivityTimer for C-DRX based on the information related to dynamic scheduling new data transmission.

According to the method performed by the user equipment provided by the disclosure, the determining of starting or restarting the drx-InactivityTimer for C-DRX includes: determining to start or restart the drx-InactivityTimer for C-DRX after the first symbol or a preset gap after the scheduling without grant transmission.

According to the method performed by the user equipment provided by the disclosure, the scheduling without grant transmission includes uplink scheduling without grant transmission and/or downlink scheduling without grant transmission.

According to the method performed by the user equipment provided by the disclosure, wherein a value of the drx-InactivityTimer for C-DRX triggered by the scheduling without grant transmission is the same as or different from that of a drx-InactivityTimer for C-DRX triggered by a Physical Downlink Control Channel (PDCCH) indicating new data transmission.

According to the method performed by the user equipment provided by the disclosure, wherein information for indicating whether the time-frequency domain resource of the one or more second transport blocks of the multiple transport blocks is used or information for indicating whether there is dynamic scheduling new data transmission after the scheduling without grant transmission, is carried in at least one of the following manners: carried by a Media Access Control Control Element (MAC CE); carried in a piggyback way on a part of time-frequency domain resources for the scheduling without grant; or carried by a Demodulation Reference Signal (DMRS) or a scrambling sequence of Cyclic Redundancy Check (CRC) for the scheduling without grant transmission implicitly.

According to the method performed by the user equipment provided by the disclosure, wherein the MAC CE is included in a media access control protocol data unit (MAC PDU) for the scheduling without grant transmission.

According to the method performed by the user equipment provided by the disclosure, wherein the information related to scheduling without grant includes information for indicating whether scheduling without grant transmission on a current non-active bandwidth part is in an active state, and if the information indicates that the scheduling without grant transmission on the current non-active bandwidth part is in the active state, the performing of the operation related to scheduling without grant includes: determining, before each transmission moment for scheduling without grant transmission on a first bandwidth part, whether to switch from a second bandwidth part to the first bandwidth part, wherein the second bandwidth part is a currently active bandwidth part and the first bandwidth part is the currently non-active bandwidth part; switching from the second bandwidth part to the first bandwidth part and performing the corresponding scheduling without grant transmission on the first bandwidth part if it is determined to switch from the second bandwidth part to the first bandwidth part, and switching from the first bandwidth part to the second bandwidth part after the corresponding scheduling without grant transmission on the first bandwidth part is performed and completed.

According to the method performed by the user equipment provided by the disclosure, wherein the determining of whether to switch from the second bandwidth part to the first bandwidth part includes: determining to switch from the second bandwidth part to the first bandwidth part, if the scheduling without grant transmission on the first bandwidth part does not conflict with transmission on the second bandwidth part; determining whether to switch from the second bandwidth part to the first bandwidth part according to a priority of the scheduling without grant transmission on the first bandwidth part and a priority of the transmission on the second bandwidth part, if the scheduling without grant transmission on the first bandwidth part conflicts with the transmission on the second bandwidth part.

According to the method performed by the user equipment provided by the disclosure, wherein the determining of whether to switch from the second bandwidth part to the first bandwidth part according to the priority of the scheduling without grant transmission on the first bandwidth part and the priority of the transmission on the second bandwidth part includes: determining to switch from the second bandwidth part to the first bandwidth part, if the priority of the transmission on the second bandwidth part is higher than a preset threshold, and/or if the priority of the transmission on the second bandwidth part is less than or equal to the priority of the scheduling without grant transmission on the first bandwidth part.

According to the method performed by the user equipment provided by the disclosure, wherein the switching from the first bandwidth part to the second bandwidth part after the corresponding scheduling without grant transmission on the first bandwidth part is performed and completed includes at least one of the following operations: switching from the first bandwidth part to the second bandwidth part immediately after signaling indicating the switching from the first bandwidth part to the second bandwidth part is received; switching from the first bandwidth part to the second bandwidth part immediately after a preset time window after switching from the second bandwidth part to the first bandwidth part; switching from the first bandwidth part to the second bandwidth part immediately after the corresponding scheduling without grant transmission on the first bandwidth part; switching from the first bandwidth part to the second bandwidth part immediately after a preset time window after the corresponding scheduling without grant transmission on the first bandwidth part; switching from the first bandwidth part to the second bandwidth part immediately after Hybrid Automatic Repeat Request (HARQ) feedback for corresponding downlink scheduling without grant transmission on the first bandwidth part is transmitted; switching from the first bandwidth part to the second bandwidth part immediately after a preset time window after the Hybrid Automatic Repeat Request (HARQ) feedback for the corresponding downlink scheduling without grant transmission on the first bandwidth part is transmitted; switching from the first bandwidth part to the second bandwidth part immediately after Hybrid Automatic Repeat Request (HARQ) feedback for corresponding uplink scheduling without grant transmission on the first bandwidth part is received; switching from the first bandwidth part to the second bandwidth part immediately after a preset time window after the Hybrid Automatic Repeat Request (HARQ) feedback for the corresponding uplink scheduling without grant transmission on the first bandwidth part is received; switching from the first bandwidth part to the second bandwidth part immediately after the Hybrid Automatic Repeat Request (HARQ) feedback for the corresponding downlink scheduling without grant transmission on the first bandwidth part is transmitted, if the downlink scheduling without grant transmission is decoded successfully; switching from the first bandwidth part to the second bandwidth part immediately, after the Hybrid Automatic Repeat Request (HARQ) feedback for the corresponding uplink scheduling without grant transmission on the first bandwidth part is received and if the HARQ feedback indicates that the uplink scheduling without grant transmission is decoded successfully.

According to the method performed by the user equipment provided by the disclosure, wherein the information related to C-DRX includes at least one of the following information: related information for configuring multiple different C-DRX configurations of a same serving cell; related information for configuring multiple different values of a same C-DRX parameter; or related information for dynamically and adaptively reconfiguring C-DRX parameters.

According to the method performed by the user equipment provided by the disclosure, wherein the information related to C-DRX includes the related information for configuring multiple different C-DRX configurations of a same serving cell, and the performing of the operation related to C-DRX including performing at least one of: maintaining multiple C-DRX operations corresponding to the multiple different C-DRX configurations at a same moment, and monitoring a Physical Downlink Control Channel (PDCCH) of the serving cell when any C-DRX operation is in an active time; or maintaining a C-DRX operation corresponding to one C-DRX configuration of the multiple different C-DRX configurations at a same moment, activating, according to a received activation instruction for activating one C-DRX configuration of the multiple different C-DRX configurations, to enable the corresponding one C-DRX configuration, and continuing running or stopping all C-DRX timers that have been run before the activation instruction; or maintaining the C-DRX operation corresponding to one C-DRX configuration of the multiple different C-DRX configurations at the same moment, activating to enable the corresponding one C-DRX configuration according to an activated bandwidth part, and continuing running or stopping all C-DRX timers that have been run previously.

According to the method performed by the user equipment provided by the disclosure, the activation instruction is carried by Downlink Control Information (DCI) or a Media Access Control Control Element (MAC CE).

According to the method performed by the user equipment provided by the disclosure, the information related to C-DRX includes related information for configuring multiple different values of a same C-DRX parameter, and the performing of the operation related to C-DRX including: receiving an instruction for activating one of multiple different values of the C-DRX parameters, and activating to enable corresponding values of the C-DRX parameters according to the received instruction.

According to the method performed by the user equipment provided by the disclosure, wherein the instruction may be carried by Downlink Control Information (DCI) or a Media Access Control Control Element (MAC CE).

According to the method performed by the user equipment provided by the disclosure, the C-DRX parameter is a drx-InactivityTimer for C-DRX, and the performing of the operation related to C-DRX includes: starting or restarting a drx-InactivityTimer for C-DRX with a corresponding value at the first symbol after receiving a Physical Downlink Control Channel (PDCCH) for scheduling new data transmission according to at least one of: a Downlink Control Information (DCI) format used by the PDCCH; a Cell Radio Network Temporary Identifier (C-RNTI) value used by the PDCCH; a PDCCH search space where the PDCCH is located; a Control Resource Set (CORESET) where the PDCCH is located; a bandwidth part where the PDCCH is located; whether data scheduled by the PDCCH is uplink data or downlink data.

According to the method performed by the user equipment provided by the disclosure, wherein the related information for dynamically and adaptively reconfiguring a C-DRX parameter is carried by Downlink Control Information (DCI) or a Media Access Control Control Unit (MAC CE), and is used to indicate at least one of: a value for reconfiguring the C-DRX parameter of the first Discontinuous Reception (DRX) cycle after the related information; a value for reconfiguring the C-DRX parameter of the first to N-th DRX cycles after the related information, wherein N is a predefined or pre-configured value; a value for reconfiguring the C-DRX parameter of all DRX cycles after the related information, until the value of the C-DRX parameter is reconfigured.

According to the method performed by the user equipment provided by the disclosure, the C-DRX parameter includes at least one of the following C-DRX parameters, and/or the multiple different C-DRX configurations share at least one of the following C-DRX parameters: a DRX long cycle start offset drx-LongCycleStartOffset, a DRX slot offset drx-SlotOffset, a DRX duration timer drx-onDurationTimer, a DRX inactivity timer drx-InactivityTimer, a DRX short cycle drx-ShortCycle, DRX short cycle timer drx-ShortCycleTimer, a DRX downlink retransmission timer drx-RetransmissionTimerDL, a DRX uplink retransmission timer drx-RetransmissionTimerUL, a DRX downlink hybrid automatic repeat request round trip time timer drx-HARQ-RTT-TimerDL and a DRX uplink hybrid automatic repeat request round trip time timer drx-HARQ-RTT-TimerUL.

According to an aspect of the disclosure, there is provided a user equipment including a transceiver configured to transmit and receive signals with the outside; and a processor configured to control the transceiver to perform any of the above methods performed by the user equipment.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE), the method comprising:
receiving configuration information related to multiple configured grant (CG) physical uplink shared channel (PUSCH), wherein the configuration information comprises first information related to a cycle of the multiple CG PUSCH and second information related to a number of a plurality of CG PUSCHs in the cycle of the multiple CG PUSCH;
determining hybrid automatic repeat request (HARQ) process identifications (IDs) associated with the plurality of CG PUSCHs, based on the first information and the second information; and
transmitting at least one of the plurality of CG PUSCHs corresponding to the HARQ process IDs,
wherein at least one of the plurality of CG PUSCHs includes information indicating whether at least one subsequent CG PUSCH is transmitted or not.

2. The method of claim 1, where the configuration information further comprises:
information related to a number of HARQ processes, and information related to determination of a first HARQ process ID.

3. The method of claim 1, wherein determining the HARQ process ID comprises:
determining a HARQ process ID corresponding to remaining CG PUSCH other than a first CG PUSCH in the cycle, by adding a first HARQ process ID corresponding to the first CG PUSCH to a PUSCH index of the remaining CG PUSCH.

4. The method of claim 1, wherein at least one of the HARQ process IDs associated with the plurality of CG PUSCHs, is determined based on the first information, the second information, and an index number of each CG PUSCH in the cycle.

5. The method of claim 4, wherein the index number is an index of each CG PUSCH in the cycle, and is greater than or equal to 0 and less than the number of CG PUSCHs.

6. The method of claim 1, wherein the HARQ process IDs are determined based on the first information, the second information, and a current symbol index associated with a first CG PUSCH in the cycle.

7. An user equipment (UE) comprising:
a transceiver; and
a processor coupled with the transceiver,
wherein the processor is configured to:
receive configuration information related to multiple configured grant (CG) physical uplink shared channel (PUSCH), wherein the configuration information comprises first information-related to a cycle of the multiple CG PUSCH, and second information-related to a number of a plurality of CG PUSCHs in the cycle of the multiple CG PUSCH,
determine hybrid automatic repeat request (HARQ) process identifications (IDs) associated with the plurality of CG PUSCHs, based on the first information and the second information, and
transmitting at least one of the plurality of CG PUSCHs corresponding to the HARQ process IDs, and
wherein at least one of the plurality of CG PUSCHs includes information indicating whether at least one subsequent CG PUSCH is transmitted or not.

8. A method performed by a base station, the method comprising:
transmitting, to an user equipment (UE), configuration information related to multiple configured grant (CG) physical uplink shared channel (PUSCH), wherein the configuration information comprises first information-related to a cycle of the multiple CG PUSCH, and second information-related to a number of a plurality of CG PUSCHs in the cycle of the multiple CG PUSCH;
determining hybrid automatic repeat request (HARQ) process identifications (IDs) associated with the plurality of CG PUSCHs, based on the first information and the second information; and
receiving, from the UE, at least one of the plurality of CG PUSCHs corresponding to the HARQ process IDs,
wherein at least one of the plurality of CG PUSCHs includes information indicating whether at least one subsequent CG PUSCH is transmitted or not.

9. A base station comprising:
a transceiver; and
a processor coupled with the transceiver,
wherein the processor is configured to:
transmit, to an user equipment (UE), configuration information related to multiple configured grant (CG) physical uplink shared channel (PUSCH), wherein the configuration information comprises first information-related to a cycle of the multiple CG PUSCH, and second information-related to a number of a plurality of CG PUSCHs in the cycle of the multiple CG PUSCH, determine hybrid automatic repeat request ((HARQ) process identifications (IDs) associated with the plurality of CG PUSCHs, based on the first information and the second information, and receive, from the UE, at least one of the plurality of CG PUSCHs corresponding to the HARQ process IDs, and wherein at least one of the plurality of CG PUSCHs includes information indicating whether at least one subsequent CG PUSCH is transmitted or not.

* * * * *